United States Patent
August et al.

(10) Patent No.: US 7,627,388 B2
(45) Date of Patent: Dec. 1, 2009

(54) RELIABILITY TOOLS FOR COMPLEX SYSTEMS

(75) Inventors: James Kermit August, Arvada, CO (US); Krishna Vasudevan, Golden, CO (US)

(73) Assignee: Core, Inc., Arvada, CO (US)

( * ) Notice: Subject to any disclaimer, the term of this patent is extended or adjusted under 35 U.S.C. 154(b) by 141 days.

(21) Appl. No.: 11/461,316

(22) Filed: Jul. 31, 2006

(65) Prior Publication Data

US 2007/0100584 A1 May 3, 2007

Related U.S. Application Data

(60) Provisional application No. 60/731,324, filed on Oct. 28, 2005.

(51) Int. Cl.
G05B 9/02 (2006.01)
(52) U.S. Cl. ............................ 700/79; 702/185
(58) Field of Classification Search ........... 702/184, 702/185; 700/21, 79; 703/6, 7
See application file for complete search history.

(56) References Cited

U.S. PATENT DOCUMENTS

| | | | |
|---|---|---|---|
| 6,006,171 | A | 12/1999 | Vines et al. |
| 6,243,774 | B1 | 6/2001 | Eide et al. |
| 6,609,090 | B1 | 8/2003 | Hickman et al. |
| 6,625,510 | B2 | 9/2003 | Kimball et al. |
| 6,820,157 | B1 | 11/2004 | Eide et al. |
| 6,873,949 | B2 | 3/2005 | Hickman et al. |
| 2002/0128790 | A1 | 9/2002 | Woodmansee |
| 2003/0078798 | A1 | 4/2003 | Zaks et al. |
| 2003/0130755 | A1 | 7/2003 | Bazzocchi et al. |
| 2004/0193467 | A1 | 9/2004 | Williams et al. |
| 2005/0021449 | A1 | 1/2005 | Sweeney |
| 2005/0043965 | A1 | 2/2005 | Heller et al. |

OTHER PUBLICATIONS

August et al. "Effective Maintenance PM Task Selective Requirement". ASME IJPGC (Jun. 2003): 1-10.*
Abbott Analytical Products, "Quality/Reliability Resources," available at http://qed1.home.mindspring.com/ (1988) (2 pages) (printed on Jun. 21, 2006).
Bi-Cycle, "Home," available at http://www.bi-cycle.com/ (1996) (1 page) (printed on Jun. 21, 2006).
Bi-Cycle, "Product," available at http://www.bi-cycle.com/maintenance_software/index.htm (1996) (1 page) (printed on Jun. 21, 2006).
BQR Reliability Engineering Ltd., "BQR Reliability Software and Maintenance Planning & Optimization," available at http://www.bqr.com/ (1989) (1 page) (printed on Jun. 21, 2006).

(Continued)

*Primary Examiner*—Ryan A Jarrett
(74) *Attorney, Agent, or Firm*—Sheridan Ross P.C.

(57) ABSTRACT

Tools for the maintenance of complex plants or systems are provided. A master equipment list of components included in a complex plant are organized according to systems. Those components that are critical to the function of the associated system are identified. A template modeling aspects of each critical component is prepared. Information included in applied templates can be reused in association with common or similar components. Particular information included in applied templates may include information related to critical parts within the component, and information regarding maintenance requirements and procedures associated with the component or parts included in the component.

16 Claims, 50 Drawing Sheets

OTHER PUBLICATIONS

BQR Reliability Engineering Ltd., "BQR-Care FMEA/FMECA module," available at http://www.bqr.com/fmea.html (1989) (2 pages) (printed on Jun. 21, 2006).

MaintControl, "Optimizer+," available at http://www.maintcontrol.com (2006) (11 pages) (printed on Jun. 21, 2006).

Fractal Solutions Inc., "Reliabilty Centered Maintenance Software and Services/ Fractal Solutions," available at http://www.fractalsolutions.com/ (1991) (1 page) (printed on Jun. 21, 2006).

Fractal Solutions Inc., "Reliabilty Centered Maintenance and Scheduling Software/ Fractal Solutions," available at http://www.fractalsolutions.com/Products.html (1991) (1 page) (printed on Jun. 21, 2006).

Fractal Solutions Inc., "Reliabilty Centered Maintenance Software/ PREMO Xperts," available at http://www. fractalsolutions.com/premoxperts.html (1991) (1 page) (printed on Jun. 21, 2006).

Quality Systems Engineering, "Manufacturers of applications for the FMEA (Potential Failure Mode and Effects Analysis) and . . . ," available at http://web.archive.org/web/20050205012513/qseprocess.com/pfmea/pfmea_home.html (May 2004) (1 page) (printed on Jun. 23, 2006).

General Physics Corporation, "General Physics Corporation—Workforce Development for the World," available at http://web.archive.org/web/20001121011700/http://www.gpworldwide.com/ (Mar. 2004) (1 page) (printed on Jun. 23, 2006).

HSB Global Standards Reliability Technology, "HSB Global Standards Reliability Technologies," available at http://web.archive.org/web/20030611133138/http://hsbrt.com (2003) (1 page) (printed on Jun. 23, 2006).

HSB Global Standards Reliability Technology, "HSB Global Standards Reliability Technologies," available at http://web.archive.org/web/20030604062426/hsbrt.com/rcm2.htm (2003) (1 page) (printed on Jun. 23, 2006).

New Dimension Solutions, "New Dimension Solutions: Lines of Business," available at http://web.archive.org/web/20040201231049/www.nd-solutions.com/LOB.php (Jan. 2004) (1 page) (printed on Jun. 23, 2006).

New Dimension Solutions, "New Dimension Solutions," available at http://web.archive.org/web/20040124025203/http://www.nd-solutions.com (Jan. 2004) (1 page) (printed on Jun. 23, 2006).

Sydvest, "Sydvest Software—Software tools for analysis and management of safety and reliability," available at http://web.archive.org/web/20030406115045/http://www.sydvest.com/ (2003) (2 pages) (printed on Jun. 23, 2006).

MaintControl, "Welkom bij MaintControl bv," available at http://www.maintcontrol.com/mc/engels/index.html (2006) (1 page) (printed on Jun. 21, 2006).

Maintenance 2000, "Improving maintenance management and operational reliability for industry by applying leading . . . ," available at http://www.maint2k.com (2000) (2 pages) (printed on Jun. 21, 2006).

Maintenance 2000, "Software Packages to conduct Reliability-Centered Maintenance or FMEA analyses, perform RA . . . ," available at http://www.maint2k.com/reliability-maintenance-optimization-software.htm (2000) (2 pages) (printed on Jun. 21, 2006).

Developed by Cambridge Database Technologies for Maintenance 2000, "Release Notes for RCM Professional 3.0," (2000) (17 pages) (printed on Jun. 21, 2006).

MRG Exclusives, "Management Resources Group, Inc.," available at http://www.mrginc.net/ (2005) (2 pages) (printed on Jun. 21, 2006).

MRG Business Centered Reliability, "ERS," available at http://www.mrginc.net/ers.htm (2005) (2 pages) (printed on Jun. 21, 2006).

ReliaSoft, "Reliability Software, Training, Consulting and Related Services from ReliaSoft Corporation," available at http://www.reliasoft.com (1992) (2 pages) (printed on Jun. 21, 2006).

Planned Maintenance Optimisation, "PMO2000—pmoptimisation," available at http://www.reliabilityassurance.com (2000) (2 pages) (printed on Jun. 21, 2006).

Planned Maintenance Optimisation, "PMO2000—Information," available at http://www.reliabilityassurance.com/pmo2000/default.asp (2000) (2 pages) (printed on Jun. 21, 2006).

Sydvest, "CARA-FaultTree? Fault tree construction and analysis software tool," available at http://web.archive.org/web/20030619033229/www.sydvest.com/Products/Manifer/default.asp (2003) (1 page) (printed on Jun. 23, 2006).

Quality Systems Engineering, "Welcome to Quality Systems Engineering Inc.," available at http://web.archive.org/web/20040811023444/qseprocess.com/home/home.html (May 2004) (3 pages) (printed on Jun. 23, 2006).

Quality Systems Engineering, "Welcome to Quality Systems Engineering Inc.," available at http://web.archive.org/web/20040518150115/http://qseprocess.com/ (May 2004) (2 pages) (printed on Jun. 23, 2006).

Strategic, "Home," available at http://www.strategicorp.com/ (2003) (2 pages) (printed on Jun. 21, 2006).

Strategic, "Products," available at http://www.strategicorp.com/products.htm (2003) (2 pages) (printed on Jun. 21, 2006).

Strategic, "Products—RCM Turbo," available at http://www.strategicorp.com/products-rcmturbo.htm (2003) (4 pages) (printed on Jun. 21, 2006).

FMECA, "Home," available at http://web.archive.org/web/19981202050329/http://www.fmeca.com (1998) (1 page) (printed on Jun. 23, 2006).

FMECA, "FMEA Facilitator," available at http://web.archive.org/web/19981205090956/www.fmeca.com/ffsoft/ffhome.htm (1998) (1 page) (printed on Jun. 23, 2006).

JMS Software, "Reliability Centered Maintenance Software by JMS Software," available at http://web.archive.org/web/20000202065811/http://www.jmssoft.com/worksaver.html (2000) (2 pages) (printed on Jun. 23, 2006).

JMS Software, "JMS Software—Reliability Centered Maintenance," available at http://web.archive.org/web/20000110185404/http://www.jmssoft.com/index.html (2000) (1 page) (printed on Jun. 23, 2006).

Ivara, "Ivara Corporation—Products/Solutions," available at http://web.archive.org/web/20000620214517/www.ivara.com/ProductsSolutions/products.html (2000) (1 page) (printed on Jun. 23, 2006).

Ivara, "Ivara Corporation—CMMS/EAM solutions that give you the Speed to Achieve," available at http://web.archive.org/web/20000616230338/http://www.ivara.com (2000) (1 page) (printed on Jun. 23, 2006).

ABB, "ABB acquires assets of HSB Reliability Technologies, LLC," available at http://www.abb.com/global/seitp/seitp202.nsf/ (May 2005) (2 pages) (printed on Jun. 21, 2006).

ARMS Reliability Engineers, "Asset Reliability & Maintainability Specialists—ARMS Reliability Engineers," available at http://www.reliability.com.au/ (2004) (3 pages) (printed on Jun. 21, 2006).

EPRI Solutions, "EPRI Solutions," available at http://www.eprisolutions.com/ (2006) (2 pages) (printed on Jun. 21, 2006).

Aladon, "Welcome to the Aladon Web Site," available at http://www.aladon.com (2006) (1 page) (printed on Jun. 21, 2006).

Management Resources Group Inc., "Management Resources Group, Inc., (MRG)," available at http://web.archive.org/web/20001007053848/mrginc.net/mrgmain.html (2000) (1 page) (printed on Jun. 23, 2006).

* cited by examiner

| PartSerNum | Part Name | PF Name | PM Name | Interval/Units | LTA/Key | PM Strategy | PM Basis Input Author |
|---|---|---|---|---|---|---|---|
| 1006 | Bus Stabs | Misaligned | Perform thermography | 4 A (annual) | | Pred | |
| 1010 | Operating Mechanism | Loose parts | Perform acoustic monitoring | 4 A (annual) | | Pred | |
| 2088 | Circuit Control Fuses | Overheating | Perform thermography | 4 A (annual) | | Pred | |
| 1007 | Electrical Devices (micro | Insulation breakdown | Test resistance to ground | 12 A (annual) | | TBM | |
| 2119 | Capacitor | Current unbalance | Perform motor current signature analy | 10 A (annual) | | Pred | |
| 372 | Main Bearings | Wear | Replace lubricant | 10 A (annual) | | TBM | NRC Regulations:Wear problem in |
| 372 | Main Bearings | Wear | Replace lubricant | 10 A (annual) | | TBM | NRC Regulations:Incorrectly refere |
| 2082 | Puffer Piston | Fails to operate | Inspect puffer piston rods for fatigue | 4 A (annual) | | Pred | NRC Regulations:Assists magnetic |
| 2082 | Puffer Piston | Fails to operate | Replace puffer assembly | 12 A (annual) | | TBM | |
| 1007 | Electrical Devices (micro | Poor contact | Replace switch | 8 A (annual) | | Pred | |
| 1011 | Racking Mechanism & Sl | Loose/failed parts | Check racking effort | 1 A (annual) | | NORM OPS | |
| 372 | Main Bearings | Lubricant hardening | Examine lube visually | 4 A (annual) | | Pred | |
| 1011 | Racking Mechanism & Sl | Damaged latch parts | Check alignment | 10 A (annual) | | FF | |
| 372 | Main Bearings | Wear | Relubricate main bearings | 12 A (annual) | | TBM | Experience:Relubrication of main b |
| 372 | Main Bearings | Lubricant hardening | Relubricate main bearings | 12 A (annual) | | TBM | |
| 372 | Main Bearings | Lubricant hardening | Test operate (time) | 4 A (annual) | | Pred | |
| 376 | Trip/Reset Mechanism | Fails to trip | Test operate | 1 A (annual) | | FF | |
| 372 | Main Bearings | Wear | Time test breaker mechanism | 4 A (annual) | | Pred | NRC Regulations:Wear problem is |
| 1010 | Operating Mechanism | Damaged/failed parts | Test operate (time, adjust & replace a | 4 A (annual) | | FF | |
| 1010 | Operating Mechanism | Worn, loose parts | Test operate (time, measure time) | 4 A (annual) | | Pred | |
| 1010 | Operating Mechanism | Loose parts | Test operate (adjust & replace as nee | 12 A (annual) | | TBM | |
| 372 | Main Bearings | Wear | Stroke operate to distribute libe | 4 A (annual) | | Pred | |
| 375 | Interlocks & Protective | Undervoltage trip fail | Test UV trip device | 6 A (annual) | | TBM | NRC Regulations:Calibration requir |
| 1009 | Main, Arcing Contacts | Pitted arcing contacts | Inspect arcing contacts | 4 A (annual) | | Pred | |
| 1009 | Main, Arcing Contacts | Damaged/failed part | Inspect arcing contacts | 4 A (annual) | | Pred | |
| 1009 | Main, Arcing Contacts | Pitted main contacts | Inspect arcing contacts for cracks | 4 A (annual) | | Pred | |

| Template | SWG-1 | | 52 | |
|---|---|---|---|---|

Switchgear - Low Voltage

Type      BKR          Manufacturer    Westinghouse
Subtype   LV
Details
Component Background

| Type | Subtype | No. | Name | |
|---|---|---|---|---|
| BKR | LV | SWG-1 | Switchgear - Low Voltage | |
| Manuf | Model | | Owner | |
| Westinghouse | 52 | | | |

| Brief |
|---|
| Switchgear - Low Voltage |

| Complete Description |
|---|
| Low voltage air blast breaker, 13.6 kV and below. Common 4kV application being replaced by vacuum breakers. |

| Scope |
|---|
| Low Voltage Switchgear include the enclosure, circuit breaker, protective devices, and their accessories:<br>· Switchgear enclosure including racking mechanism, busbar |

| Reference/Open Items |
|---|
| 1. "Circuit Breaker Maintenance, Volume 1: Low-Voltage Circuit Breakers, Part 1: ABB K Line", EPRI (NMAC) NP-7410s-v1-p1, March 1993.<br>2. "Circuit Breaker Maintenance, Volume 1: Low-Voltage Circuit Breakers, Part 2: GE AK Models", EPRI (NMAC) NP-7410s-v1-p2, July 1992.<br>3. "Circuit Breaker Maintenance, Volume 1: Low-Voltage Circuit Breakers, Part 3: Westinghouse DB Models", EPRI (NMAC) NP-7410s-v1-p3, December 1992.<br>4. "Circuit Breaker Maintenance, Volume 1: Low-Voltage Circuit Breakers, Part 4: Westinghouse DS Models", EPRI (NMAC) NP-7410s-v1-p4, December 1992.<br>5. "Comprehensive Low-Cost Reliability Centered Maintenance", EPRI TR-105365, June 1995.<br>6. "EPRI Reliability Centered Maintenance Technical Handbook", EPRI TR-100320, January 1992.<br>7. "Guide for Determining Preventive Maintenance Task Intervals", EPRI TR-103147, December 1993.<br>8. NRC Information Notice 96-46, "Zinc Plating of Hardened Metal Parts and Removal of Protective Coatings in Refurbished Circuit Breakers". (Addresses the concern that NLI/NSS may have not identified all of the zinc-plated parts in low and medium voltage circuit breakers manufactured by General Electric and Westinghouse.)<br><br>ANSI C37.50-1989, Low-Voltage AC Power Circuit Breakers Used in Enclosures-Test Procedures, arranged as follows: Section 1-General; Section 2-General Test Conditions and Requirements; Section 3-Design Test Requirements; Section 4-Accessory Devices; Section 5-Treatment of Failures within Test Sequences; Section 6-Production Tests; and Section 7-Production Monitoring and Product Test Requirements.<br><br>This ANSI standard relates only to manufacturing of the PCB. Each manufacturer supplies instructions for performing its recommended tests. These tests may differ from one manufacturer to another, making it difficult to standardize on any testing procedure. You can use the NETA standards to help develop a standardized testing routine for PCBs. The ANSI standard does give good detail on the following tests:<br><br>Trip-device calibration,<br>AC dielectric withstand-voltage,<br>Continuous current,<br>Overload switching,<br>Endurance,<br>Short-circuit current, and |

FIG.22A

| Short-time current. |
|---|
| NETA recommends using its standards with any applicable manufacturer standard. Of course, you still should use qualified personnel who are trained and certified in the equipment and test methodology. PCB test equipment is much the same type as MCCB test equipment. |
| Additional Basis Information |
| Expert-identified common dominant failure location/mechanisms:<br>· Circuit breaker operating mechanism<br>· Circuit breaker & cubicle racking mechanism<br>· Circuit breaker main current, arc quenching, insul components<br>· Electrical devices and wiring |
| Equipment Name |
| the switchgear enclosure, circuit breaker, protective devices, and their accessories, as follows:<br><br>· Switchgear enclosure including racking mechanism, busbar and insulation, cabinets, interlocks and switches, lightning arrestors, bus PTs (potential tran |

Functions/Failures

| Rank | Component Function(s)/Failures | Consequences | Degree |
|---|---|---|---|
| 1 | Contain & suppress arc flash<br>Fails to contain arc flash | Flashover | Complete |
| 2 | Trip on fault<br>Fails to trip on fault | Fails to trip on fault | Complete |
| 3 | Allow normal load disconnect<br>Fails to allow normal disconnect routing ON DEMAND | Fails to disconnect loads | Complete |
| 4 | Power loads from high voltage bus<br>Fails to power loads from high voltage bus | Fails to close in on load | Complete |
| 5 | | Spurious trips | Partial |
| 6 | Facilitate maintenance<br>Fails to facilitate maintenance | Can't clear equipment for maintain | Partial |
| 7 | Control maintenance cost<br>Fails to control maintenance cost | Unnecessary maintenance cost | Complete |
| 8 | Provide satus<br>Fails to provide system status | Fails to provide status | Minor |

Parts

| No. | Part/*Alternate Name* | Functions | Notes |
|---|---|---|---|
| 4b | Arc Chutes<br><br><br><br><br><br><br>*Arc Chutes Quench* | Cool, control and suppress eclecti | Verify adjustments<br>· Inspect puffer and verify operation<br>· Perform ductor test<br>· Perform insulation resistance tests<br>· Calibrate protective devices as required<br>· Perform overcurrent trip test<br>· Perform as-left electrical open/close and timing test |

FIG.22B

| | | | |
|---|---|---|---|
| 8c | Aux Switches/Contacts | Provide auxiliary control functions | |
| 7b | Bus CT/PTs<br>Current Transformer | Power control circuits and relays i | |
| 1c | Bus Stabs | Connect breaker to bus and load | The normal heating effect of the main current may be allowed for by comparing the breaker or cubicle temperature with that of neighboring breakers carrying similar loads or by trending the temperature readings of a particular unit over time. The recommended period for thermographic inspection is 1 year because of the quick, non-intrusive nature of the task and the ease with which many adjacent cubicles can be surveyed at one time and location. This task interval is significantly shorter than the times to first failure anticipated from the above failure causes, and results in thermography being an effective condition monitoring task for those failure causes. Consideration should be given to extending thermographic scan intervals taking into account breaker loading conditions and previous thermographic histories.This task detects temperature increases, associated with main current carrying components, caused by degraded or loose connections, or contacts. The interval is not supported by the failure mode data so that some interval extension could be possible, eve |
| 1a | Cabinet | Protect breaker and cube controls; | |
| 8b | Controls Cubicle<br>Programmable Logic Controller (PLC). | House and protect controls | |
| 1b | Cubicle | Provide controlled environment | Cubicle Detailed Inspection may not be carried out at the same time as the Breaker Detailed Inspection, although it may be convenient to synchronize the inspections and overhauls. Inspection of buswork will be visual and by thermography as described in the thermography task for breaker and cubicle. Line and load side insulation should be visually inspected and have its insulation resistance tested. |
| 3c | Electrical Devices (micro switch<br>Electrical Devices (micro switches, aux. | Sense position for interlocks, coin | Electrical Devices (micro switches, aux. switches, secondary disconnects, fuse blocks, aux. relays, charging motor, heaters) |
| 9b | Indications | Provide status | |
| 3 | Insulation, Phase/Main<br>Electric Insulation | Insulate voltage from ground; cont | |
| 8a | Interlocks & Protective Devices | Prevent closed breaker racking on | Prevent operations that are inherently dagerous or consume breaker life. |
| 7a | Lightning/Surge Arrestors | Ground high voltage spikes | Usually not applied below 4kV level SWGR |

FIG.22C

| | | | |
|---|---|---|---|
| 5a | Lubricant | Lubricate operating mechanism be | All of the failure mechanisms discussed above progress continuously for a period of years before the failure point is reached. The minimum duration of this wearout characteristic is usually controlled by the service conditions that affect lubrication failure. Preventive maintenance (PM) within this period can identify and intercept all the failure mechanisms excepting those due to design, manufacturing, and installation defects, and maintenance error. These are excluded from consideration here because their random nature does not lend itself to being addressed by regularly scheduled PM tasks, other than failure finding such as the operability test, trip tests, or calibration. An overhaul is necessary to completely clean out old lubricant and to renew lubricant at every point in the breaker within about 10 years for low duty cycle and mild service conditions. The detailed inspection should be performed in order to replace as much of the lubricant as possible at a shorter interval, about half the overhaul interval.<br><br>In a Detailed Inspection, accessible pivot points and bearings can be lubricated, although they probably still can not be properly cleaned. Manual and electrical operation can help to distribute lubricant in all areas and mix it to prevent separation of its constituents. The "feel" of the operating mechanism during manual operation can indicate to an experienced person the general condition of the lubricant. Additionally, the time taken for the breaker to close is a direct indication of a sluggish mechanism. As-found and as-left electrical close-timing tests may be supplemented by a trip load test or by a minimum control voltage test to detect a sluggish mechanism. If the breaker does not pass these tests a detailed inspection or overhaul will be necessary.<br><br>A Detailed Inspection will typically be performed to ensure that critical breakers in severe service conditions ( e.g. high temperatures, high humidity, and salt laden air) can reach the scheduled overhaul at 8 years. In more normal conditions for critical breakers, detailed inspection can be combined in rotation with visual inspection and overhaul to provide flexibility on when the overhaul is performed (i.e. not strictly at 10 years).<br><br>Calibration tasks for the protective devices, instantaneous overcurrent, time-current excess, overvoltage and undervoltage, as appropriate, should follow the requirements of technical specifications. These tasks help to ensure that the protective relays are not already out-of-specification (failed) when needed. Where there are no technical specification requirements the |

FIG.22D

| | | | |
|---|---|---|---|
| | Mechanism lubricant | | recommended period for calibration can be paired with that of the breaker detailed inspection. At this interval, experience shows that the relays are not usually sufficiently out-of-calibration to be in a failed state. This task is a more detailed check for damage, degraded connections, and signs of overheating, checks the condition of the lubricant, and cycles the breaker mechanism. The interval is strongly determined by a large number of common wearout failure mechan |
| 3a | Main & Arcing Contacts | Carry current load closed; back up | |
| 5 | Operating Mechanism | Open on fault; close on load dema | Although the functional test is not recommended as a scheduled task, it is nevertheless recommended that the breaker be operated at least once per operating cycle for all critical and non-critical but important breakers. Any breaker, regardless of its functional importance, which remains in a static position for long periods of time, e.g. longer than 2 refueling cycles, should be functionally tested for the above reasons.<br><br>Otherwise, the functional test should be performed when:<br>· Returning powered equipment to service<br>· As per technical specifications<br>. As a post maintenance test<br><br>The functional test is an electrical open and close test which mixes the lubricant and ascertains that the breaker operating mechanism is functional. The interval is not strongly constrained by the failure mode data, but not much latitude exists for inte |
| | Charging Mechanism | | |
| 3b | Puffer Piston | Extinguishes arc blowing it into the | |
| 1b1 | Racking Mechanism / Shutter A | Allow maintenance and replaceme | |
| 9a | Sensors | Sense contactor breaker positions | Trip latch<br>Charging spring<br>Open/closed position<br>Racking |

FIG.22E

| | | | |
|---|---|---|---|
| 5b | Trip Mechanism | Trip operating mechanism | Failure mechanisms discussed above progress continuously for a period of years before the failure point is reached. The minimum duration of this wearout characteristic is usually controlled by the service conditions that affect lubrication failure. An overhaul is necessary to completely clean out old lubricant and to renew lubricant at every point in the breaker within about 12 years for low duty cycle and mild service conditions. The detailed inspection should be performed in order to replace as much of the lubricant as possible at a shorter interval, about half the overhaul interval. |
| | | | The breaker overhaul is a complete disassembly to give access to all parts for cleaning, inspection for damage and wear, and complete replacement of lubricant. The interval is strongly determined by a large number of common wearout failure mechanisms aff |

Work Orders

| | Workscope | Summary | |
|---|---|---|---|
| 1 | Inspect Swgr Cube SWITCHGEAR C | | 4 A (annual) |
| | Check racking mechanism lubrication, damaged /failed parts, and loose or missing fasteners. | The racking mechanism is subject to lubrication failure, damaged and failed parts, and loose or missing fasteners. | |
| | | Inadequate lubrication is an important cause of failures in the cubicle as it was in the breaker, although the consequences are more likely to be extended maintenance time rather than a critical event such as breaker failure to close or to trip. Assessment of the condition of the lubricating grease should be the prime objective of a cubicle inspection. A visual check of the lubricant at accessible, and hence more frequently lubricated points, should be done but will not provide a reliable assessment of its condition at other points, such as bushings and bearings, which can only be lubricated at overhaul. Hard lubricant in thin films may not be visible at all, or may appear as a varnish-like layer. | |
| | | Parts that are loose, damaged, or missing may be seen directly, often where they should not be, even by relatively inexperienced personnel. However, signs of material fatigue, abnormal wear, or material property changes can best be noted and assessed by having experienced people perform the inspection. Relatively common problem areas are the alignment of the breaker interface with the cubicle, and alignment problems causing damage to contacts, and to primary and secondary disconnects and switches. | |

FIG.22F

| 2 | Inspect Test Bkr SWITCHGEAR | | 4 A (annual) |
|---|---|---|---|
| | Check for damage, degraded connections, and signs of overheating, lubricant condition and cycles breaker mechanism. | The Detailed Inspection includes a comprehensive set of tasks designed to be an effective way to thoroughly check the operating mechanism, main current components, and the racking mechanism for mechanically worn, failed or damaged parts, loose connections and fasteners, too check the condition of the lubricant (and to cycle the operating mechanism so as to mix and distribute the lubricant), to provide an opportunity to add and refresh lubricant, and to check for burn marks or discoloration that might indicate overheating of electrical components such as relays, coils and switches. | |

Parts that are loose, damaged, or missing may be seen directly, often where they should not be (e.g. on the cubicle floor), even by relatively inexperienced personnel. However, signs of material fatigue, abnormal wear (e.g. worn bushings), or material property changes can best be noted and assessed by having experienced people perform the detailed inspection. A relatively common problem area is the alignment of the prop mechanism, its centering and tightness.

The condition of the lubricant is essential to proper operation. Inadequate lubrication is by far the dominant cause of breaker failures. Assessment of the condition of the lubricating grease should therefore be the prime objective of any inspection. Removal of arc chutes, phase barriers, inspection covers and relay/switch covers will facilitate a fairly thorough check of lubricant condition. However, the detailed inspection does not include extensive disassembly of the breaker; consequently, lubricant internal to bearings and bushings will not, in general, be accessible at the detailed inspection. Hard lubricant in thin films may not be visible at all, or may appear as a varnish-like layer.

Contaminated switches and relay contacts make up a very large proportion of the failure causes and overhaul deficiencies noted in NPRDS failure events and NMAC data analysis. These contacts should be accessible at a detailed inspection when switch covers are removed. Electrical insulation and wiring is a much smaller contributor to breaker failure.

In addition to visible damage to primary contacts, and deposits and tracking on arc quenching components, the arc contact tips may be damaged or broken off, and the puffer or the blowout coil may have failed.

MCCB standards.

NEMA publishes Standards Publication AB 4-1996, Guidelines for Inspection and Preventive Maintenance of Molded Case Circuit Breakers Used in Commercial and Industrial Applications. It's arranged as follows: Section 1-General; Section 2-Guidelines; Section 3-Inspection Procedures; Section 4-Preventive Maintenance; Section 5-Test Procedures; and Section 6-Accessory Device Test Procedures.

AB 4-1996 mentions these tests:
Mechanical operation tests,
Insulation resistance test,
Individual pole resistance test (millivolt drop),
Inverse-time overcurrent trip test,
Rated hold-in test, and Instantaneous overcurrent trip test.
The NETA specification includes these tests except the rated hold-in test. It also lists two additional tests: short-time pickup and delay test and ground-fault pickup and time delay test. Performing the NETA or NEMA tests, you must use, at minimum, a megohmmeter, current injection test set, digital multimeter, and a variable voltage supply.

FIG.22G

NEMA AB-4 gives detailed and systematic instructions for doing each test. The NETA specifications include a list of the tests, assuming a qualified and certified person performs the tests. They do not include methodology or "how-to" information.

NEMA AB-4 mentions certain sections set guidelines for inspection, preventive maintenance, and testing. But, it lets you decide what sections to use for a good program. The NETA specifications list a multitude of tests for maintenance or acceptance testing. As with NEMA AB-4, you can decide whether to perform certain tests.

3 Operations Rounds                                                                                          1 W (week)

Detects sensing line air leaks, performs routine trouble checks, monitors the equipment environment, detects unusual noises, fluid leaks, and monitors operational parameters like DT & DP.

4 Overhaul Bkr SWITCHGEAR                                                                                    8 A (annual)

Complete disassembly for cleaning, inspection, and lubricant replacement.

The failure locations and failure causes addressed by the Overhaul are the same as those addressed by the Detailed Inspection. However, in an overhaul the breaker is completely disassembled to give access to all parts for cleaning, inspection for damage and wear, and complete replacement of lubricant. Failure to do this results in wearout of the lubricant in parts inaccessible to the detailed inspection. In addition, an overhaul parts replacement kit should be used for small mechanical items like retainers, washers, nuts and bolts, bushings, gaskets and springs. Individual subcomponent replacement depending on make and model may also be necessary. The NMAC maintenance guides for low voltage circuit breakers and the appropriate vendor manuals should be consulted for parts to replace at the overhaul.

Calibration tasks for the protective devices, instantaneous overcurrent, time-current excess, overvoltage and under voltage, as appropriate, should follow the requirements of technical specifications. These tasks help to ensure that the protective relays are not already out-of-specification (failed) when needed. Where there are no technical specification requirements the recommended period for calibration can be paired with that of the breaker overhaul. At this interval, experience shows that the relays are not usually sufficiently out-of-calibration to be in a failed state.

FIG.22H

| | | |
|---|---|---|
| 5 | Test Swgr SWITCHGEAR | 4 A (annual) |
| | Electrical open & close test exercising breaker operating mechanism, which redistributes the lubricant. | The functional test is not recommended as a scheduled task, but it is nevertheless recommended that the breaker be operated at least once per operating cycle for all critical and non-critical but important breakers. Any breaker, regardless of its functional importance, which remains in a static position for long periods of time, e.g. longer than 2 refueling cycles, should be functionally tested for the above reasons. |

This does not test protective trip mechanisms but it ascertains that the breaker operating mechanism is functional and it mixes the lubricant to help prevent seizing of the mechanical parts.

The functional test is an electrical open and close test normally conducted as a post maintenance test on the breaker and also frequently as a post maintenance test on the load.

MCCB standards.

NEMA publishes Standards Publication AB 4-1996, Guidelines for Inspection and Preventive Maintenance of Molded Case Circuit Breakers Used in Commercial and Industrial Applications. It's arranged as follows: Section 1-General; Section 2-Guidelines; Section 3-Inspection Procedures; Section 4-Preventive Maintenance; Section 5-Test Procedures; and Section 6-Accessory Device Test Procedures.

AB 4-1996 mentions these tests:
Mechanical operation tests,
Insulation resistance test,
Individual pole resistance test (millivolt drop),
Inverse-time overcurrent trip test,
Rated hold-in test, and Instantaneous overcurrent trip test.
The NETA specification includes these tests except the rated hold-in test. It also lists two additional tests: short-time pickup and delay test and ground-fault pickup and time delay test. Performing the NETA or NEMA tests, you must use, at minimum, a megohmmeter, current injection test set, digital multimeter, and a variable voltage supply.

NEMA AB-4 gives detailed and systematic instructions for doing each test. The NETA specifications include a list of the tests, assuming a qualified and certified person performs the tests. They do not include methodology or "how-to" information.

NEMA AB-4 mentions certain sections set guidelines for inspection, preventive maintenance, and testing. But, it lets you decide what sections to use for a good program. The NETA specifications list a multitude of tests for maintenance or acceptance testing. As with NEMA AB-4, you can decide whether to perform certain tests.

FIG.22I

6 Thermography SWITCHGEAR 1 A (annual)

Detects current-carrying component hot spots caused by loose connections or bus stabs. Without special switchgear windows, not safe to perform on energized equipment. Normally shot from the back of the bus works, but possible in front for controls.

Thermography will detect increases in temperature that affect the whole cubicle, as well as accessible areas of the buswork. Typically such temperature increases will be associated with main current carrying components and will be caused by loose or contaminated connections, or bus stabs that are misaligned, damaged, or contaminated.

ANSI C37.50-1989, Low-Voltage AC Power Circuit Breakers Used in Enclosures-Test Procedures, arranged as follows: Section 1-General; Section 2-General Test Conditions and Requirements; Section 3-Design Test Requirements; Section 4-Accessory Devices; Section 5-Treatment of Failures within Test Sequences; Section 6-Production Tests; and Section 7-Production Monitoring and Product Test Requirements.

This ANSI standard relates only to manufacturing of the PCB. Each manufacturer supplies instructions for performing its recommended tests. These tests may differ from one manufacturer to another, making it difficult to standardize on any testing procedure. You can use the NETA standards to help develop a standardized testing routine for PCBs. The ANSI standard does give good detail on the following tests:

Trip-device calibration,
AC dielectric withstand-voltage,
Continuous current,
Overload switching,
Endurance,
Short-circuit current, and
Short-time current.

NETA recommends using its standards with any applicable manufacturer standard. Of course, you still should use qualified personnel who are trained and certified in the equipment and test methodology. PCB test equipment is much the same type as MCCB test equipment.

7 Unassigned PM Tasks 0
Do not delete this placeholder record.

Work Orders (workscope)

| | Task | Part | Failure |
|---|---|---|---|
| 1 | Thermography SWITCHGEAR | | 1 A (annual) |
| 1 | Perform thermographic survey | Bus Stabs | Overheating |
| 2 | | Main & Arcing Contacts | Corroded contacts |
| 3 | | Main & Arcing Contacts | Pitted contacts |
| 2 | Inspect Test Bkr SWITCHGEAR | | 4 A (annual) |
| 1 | Inspect chutes | Arc Chutes | Flashover (fail to quench) |
| 2 | Measure dielectric resistance | Arc Chutes | Flashover (fail to quench) |
| 3 | | Arc Chutes | Flashover (fail to quench) |
| 4 | Measure dieletric ground strength | Arc Chutes | Ground |
| 5 | Inspect arc chutes visually for cracks | Arc Chutes | Ground |
| 6 | Clean arc chutes | Arc Chutes | Flashover (fail to quench) |
| 7 | Check seal gasket visually | Cabinet | Gasket won't seal |

FIG.22J

|   |   |   |   |   |
|---|---|---|---|---|
|   | 8 | Vacuum dust | Cabinet | Dust |
|   | 9 | Chek grounds | Electrical Devices (micr | Insulation breakdown |
|   | 10 | Check contact resistance | Electrical Devices (micr | Contact resistance |
|   | 11 | Test ground insulation resistance | Insulation, Phase/Main | Insulation thermal breakdo |
|   | 12 | Test insulation resistance | Insulation, Phase/Main | Contamination insulation |
|   | 13 | Test operate | Lubricant | Trip latch oxidation product |
|   | 14 | Relubricate contact surfaces | Main & Arcing Contacts | Pitted/corroded contacts/da |
|   | 15 | Inspect contacts | Main & Arcing Contacts | Corroded contacts |
|   | 16 | Inspect lever mechanism welds for cracks | Operating Mechanism | Cracked welds |
|   | 17 | Time test operate | Operating Mechanism | Loose parts |
|   | 18 | Check area vibration loads | Operating Mechanism | Worn parts |
|   | 19 | Monitor normal racking interlocks | Racking Mechanism / S | Erroneous interlock operati |
|   | 20 | Relubricate slide contact surfaces | Racking Mechanism / S | Worn, loose or failed parts |
|   | 21 | Verify normal indications | Racking Mechanism / S | Worn, loose or failed parts |
|   | 22 | Visually inspect switch hardware | Sensors | Failed input limit switch se |
|   | 23 | Relubricate trip collapsing prop | Trip Mechanism | Slow |
| 3 | Overhaul Bkr SWITCHGEAR |   |   | 8  A (annual) |
|   | 1 | Replace chutes | Arc Chutes | Flashover (fail to quench) |
|   | 2 | Replace arc chutes | Arc Chutes | Flashover (fail to quench) |
|   | 3 |   | Arc Chutes | Ground |
|   | 4 | Relubricate latch contact surfaces | Lubricant | Trip latch oxidation product |
|   | 5 | Relubricate main bearing | Lubricant | Hardened main bearing lube |
|   | 6 | Replace contacts | Main & Arcing Contacts | Pitted contacts |
|   | 7 |   | Main & Arcing Contacts | Pitted/corroded contacts/da |
|   | 8 | Test puffer blowout | Puffer Piston | Weak puff |
|   | 9 | Relubricate collapsing mechanism/test trip | Trip Mechanism | Fails to trip |
| 4 | Inspect Swgr Cube SWITCHGEAR CUBE |   |   | 4  A (annual) |
|   | 1 | Check area conditions | Bus Stabs | Overheating |
|   | 2 | Test operate under surveillance | Electrical Devices (micr | Fail to sense position |
|   | 3 | Stroke operate | Lubricant | Hardened main bearing lube |
|   | 4 | Monitor racking effort required | Racking Mechanism / S | Worn, loose or failed parts |
|   | 5 | Test time operation | Trip Mechanism | Slow |
| 5 | Test Swgr SWITCHGEAR |   |   | 4  A (annual) |
|   | 1 | Check cube conditions | Cubicle | Moisture contamination |
|   | 2 | Test operate | Electrical Devices (micr | Contact resistance |
|   | 3 |   | Electrical Devices (micr | Misaligned/loose |
|   | 4 | Test surge protection | Lightning/Surge Arresto | Fails to ground |
|   | 5 | Time test operate | Lubricant | Hardened main bearing lube |
|   | 6 | Test operate | Operating Mechanism | Worn parts |
|   | 7 | Test accoustically | Operating Mechanism | Worn parts |

FIG.22K

| 6 | Operations Rounds | | 1 W (week) |
|---|---|---|---|
| | 1  Monitor instruments | Bus CT/PTs | Open |
| | 2  Check operations status indications | Indications | Erroneous status |

Authorties

| Application Tag(s) | | Component Name | SYSTEM | | |
|---|---|---|---|---|---|
| BKR | SWG-1 | Switchgear - Low Voltage | | 52 | 55318 ☑ |
| Applications/Users | | | | | |
| | 03683N-012 | 480V BREAKER | Westinghouse | EB | 480V Switchgea |
| | 1-52/RTB | U1 RX TRIP BKR | S | | |
| | 1-52/RTA | U1 RX TRIP BKR | S | | |
| | 1-52/BYB | U1 RX TRIP B-P BKR | | | |
| | 1-52/BYA | U1 RX TRIP B-P BKR | | | |
| | 1-24Y7274B | BREAKER | S | | |
| | 1-24Y7273B | BREAKER | S | | |
| | 03683P-01259 | 480V BREAKER | S | | |
| | 03683O-01259 | 480V BREAKER | S | | |
| | 03683N-01259 | 480V BREAKER | S | | |
| BKR | SWG-1 | Switchgear - Low Voltage | | 52 | 47564 ☑ |
| Applications/Users | | | | | |
| | 7004301 | 122A SYS 1 SEPTIC TN Westinghouse | | DE | Water Tr |
| | 7004402 | NEW ADMIN BLDG SEPTIC PM | C | | |
| | 7004401 | NEW ADMIN BLDG SEPTIC PM | C | | |
| | 7004302 | 122B SYS 1 SEPTIC TNK SUB | C | | |
| | 7004301 | 122A SYS 1 SEPTIC TNK SUB | C | | |

FIG.22L

| Template | MOT-1 | | 39 |
|---|---|---|---|

Moto - Direct Current

| Type | MOT | Manufacturer | US Motors |
|---|---|---|---|
| Subtype | DC | | |

Details

Component Background

| Type | Subtype | No. | | Name |
|---|---|---|---|---|
| MOT | DC | MOT-1 | | Motor - Direct Current |
| Manuf | Model | | Owner | |
| US Motors | 39 | | | |

| Brief |
|---|
| Motor - Direct Current |

| Complete Description |
|---|
| Small motor for emergency power in loss of AC power event |

| Scope |
|---|
| DC electric motor includes:<br>· Electric motor and motor shaft excluding the coupling<br>· All power, sensing, and control cables up to but not including the DC breaker<br>· Motor mo |

| Reference/Open Items |
|---|
| 1. "Electric Motor Predictive and Preventive Maintenance Guide", EPRI (NMAC) NP-7502, July 1992.<br>2. "Manual of Bearing Failures and Repair in Power Plant Rotating Equipment", EPRI GS-7352, July 1991.<br>3. "Electrical References Series: Vol. 6 - Motors", EPRI EL-5036- V-6.<br>4. "Guidelines for the Selection, Procurement, and Acceptance of Nuclear Safety Related Mild Environment Motor Insulation for Rewinds", EPRI TR-103585.<br>5. "Guidelines for the Selection, Procurement, and Acceptance of Nuclear Safety Related Harsh Environment Motor Insulation for Rewinds", EPRI TR-104872.<br>6. "Guidelines for the Repair of Nuclear Power Plant Safety-Related Motors (NCIG-12), EPRI NP-6407, March 1990.<br>7. NRC Information Notice 94-51, "Inappropriate Greasing of Double Shielded Motor Bearings"<br>8. ASME Guide OM-S/G-1994 Part 14, "Vibration Monitoring of Rotating Equipment in Nuclear Power Plant"<br><br>Electrical Signature Analysis (ESA) uses the electric motor as a transducer to detect electrical and mechanical faults through a significant portion of the motor system. Usually used as a go/no go test, ESA does have some trending capabilities, but will normally only detect winding faults and mechanical problems in their late stages. Some manufacturers are sensitive to load variations and readings will vary based upon the load. Requires nameplate information and many systems require the number of rotor bars, stator slots and manual input of operating speed.<br><br>Motor Circuit Analysis (MCA) testing: Instruments using combinations of values for resistance, impedance, inductance, phase angle, current: frequency response, capacitance and insulation testing can be used to troubleshoot, commission and evaluate control, connection, cable, stator, rotor, air gap and insulation to ground health. Using a low voltage output, readings are read through a series of bridges and evaluated. Non-destructive and trendable readings often months in advance of electrical failure. Note: Different manufacturers of this technology use different combinations of test values.<br><br>Several common approaches within industry as well as several new ones use a combination of energized and de-energized testing. Energized testing is best under constant load conditions and trended in the same operating conditions each time.<br><br>One common approach has been the use of insulation resistance and/or polarization index. These only identify insulation to ground faults in both the motor and cable, which represents under 1% of the overall motor system faults (~5% of motor faults).<br><br>Infrared and vibration are normally used in conjunction with each other with success. However, they miss a few common problems or only detect them in the late stages of failure. |

FIG.23A

Surge testing and high potential testing will only detect some winding faults and insulation to ground faults, with the potential to take the motor out of action should any insulation contamination or weakness exist.

MCA and ESA support each other and detect virtually all of the problems in the motor system. This accuracy requires MCA systems that use resistance, impedance, phase angle, I/F and insulation to ground and ESA systems that include voltage and current demodulation.

The newest, and most effective approach has been vibration, infrared and MCA and/or ESA. This approach combines electrical and mechanical evaluation and troubleshooting. As found in the Motor Diagnostic and Motor Health Study,[3] 38% of motor system testing involving only vibration and/or infrared see a significant return on investment. This number jumped to 100% in systems that used a combination of MCA/ESA along with vibration and/or infrared.

Additional Basis Information

Expert-identified dominant failure locations:
· Brush wear; holder spring tension/connections, & commutator
· Bearings (continuous)
· Stator winding (starts, hi temps, insulation)
· Mechanical electrical connections & terminations (windings/leads)

Equipment Name

· Electric motor and motor shaft excluding the coupling
· All power, sensing, and control cables up to but not including the DC breaker
· Motor mounting and base
· Internal motor heaters

Functions/Failures

| Rank | Component Function(s)/Failures | Consequences | Degree |
|---|---|---|---|
| 1 | Provide trip coordination with other functions<br>Fails to provide coordinate trips | Fails interface coordination | Partial |
| 2 | Provide heat removal safety<br>Fails to provide heat safe removal | Overheats | Complete |
| 3 | Provide load<br>Fails to power, start and run load | Can't maintain load | Partial |
| 4 | Trip on overload<br>Fails to trip on overload | Fails to trip on overload | Complete |
| 5 | Trip load on shutdown<br>Fails to trip on load on shutdown | Won't trip normally | Complete |
| 6 | Start and run load on demand<br>Fails to start and run load | Won't start | Complete |
| 7 | Run load meeting load requirement | Won't run load | Complete |
| 8 | Provide load status | Fails to provide status | Minor |

Parts

| No. | Part/Alternate Name | Functions | Notes |
|---|---|---|---|
| 1b | Air Inlet Openings | Allows air entrance for cooling, ve | |

FIG.23B

| | | | |
|---|---|---|---|
| 5a | Bearing Lubrication Oil (LO) | Provide sliding lubricant preventin | The observation of clogged air inlets, loose or damaged conduits or seal flex, and the detection of audible noise, are simple tasks that can be covered by operator rounds, rather than by a scheduled PM task. Although it may be convenient to address the visual inspection items in operator rounds for critical motors, there does not appear to be a need to make these observations as often as every shift. |
| | | | For particularly large and critical DC motors it will be worth including activities analogous to the on-line mechanical tests for medium voltage motors. These would consist of using plant instrumentation to trend motor current and bearing temperatures at intervals of 6 months for high cycle motors, and 12 months for standby motors. For these motors an internal visual inspection similar to the off-line task for medium voltage motors might also be appropriate. |
| | *Lube Oil* | | |
| 5c | Bearing Seals | Separate bearing lube oil/grease fr | |
| 5b2 | Bearings: Antifriction | Align rotor allowing rapid dynamic | Suggested interval of 3 months is a conservative starting point with this new technology to make acoustic monitoring an effective detection method for a range of grease-related failure causes. |
| | | | However, there may be dangers in applying the technology, e.g. if it promotes the addition of grease to bearings which are double shielded, or if it promotes overgreasing. Consideration should be given to installing new grease fittings which prevent the addition of grease when the grease pressure in the bearing reaches 20 psi, and/or fittings which relieve internal grease pressure when it rises to a preset threshold.Acoustic monitoring is focused on addressing grease-related causes of wear in bearings and other rotating components. There is little latitude for interval extension for critical motors because of the significant number of random failure mechanisms invol |
| | *Bearings & Shaft* | | |

FIG.23C

| | | | |
|---|---|---|---|
| 5b1 | Bearings: Journal | Align bearings for standard, warm | Vibration monitoring addresses a wide range of degradations in DC motors, only about a third of which are also covered by another task. This makes vibration monitoring a very important part of the PM program. Most of the degradations addressed by vibration monitoring lead to a fairly random occurrence of failures. |
| | | | However, continuously running motors are subject to much more rapid wear on the brushes, bearings, armature, commutator, and shaft than is the case for standby motors. |
| | | | Consequently, the suggested interval of 6 months for continuously running critical motors should be sufficiently frequent to permit vibration monitoring to detect almost all failures from the above degradation modes before they occur. Standby motors will generally have a much lower wear rate, although no wearout pattern is observable. |
| | *No slingers with grease lubed bearings* | | |
| 2b | Electrical Connections | Connect major electrical conducto | On suggestions from the Large Electric Motors Users Group, LEMUG, the Bridge Test should be performed every second outage, say at 3 to 4 years, but only for critical motors with power above 20 HP. |
| | | | If the Bridge Test is performed at all for critical motors below 20HP, the interval should be longer, for example, at 4.5 or 6 years. |
| | *Connections* | | |
| 1b | Fan & Cooling Air Filters | Provide clean chilled cooling air to | The observation of clogged air inlets, loose or damaged conduits or seal flex, and the detection of audible noise, are simple tasks that can be covered by operator rounds, rather than by a scheduled PM task. Although it may be convenient to address the visual inspection items in operator rounds for critical motors, there does not appear to be a need to make these observations as often as every shift. |
| | | | For particularly large and critical DC motors it will be worth including activities analogous to the on-line mechanical tests for medium voltage motors. These would consist of using plant instrumentation to trend motor current and bearing temperatures at intervals of 6 months for high cycle motors, and 12 months for standby motors. For these motors an internal visual inspection similar to the off-line task for medium voltage motors might also be appropriate. |

FIG.23D

| | | | |
|---|---|---|---|
| 2c | Feeder Cables and Motor Lead | Provide power feed to motor from | Cables – Before and After the Controls Common cable problems:<br>· Thermal breakdown due to overloads or age<br>· Contamination in cables that pass underground through conduit<br>· Phase shorts as well as grounds caused by 'treeing' or physical damage.<br>· Opens due to physical damage.<br>· Physical damage occurs combined with other cable problems. |
| 1a | Frame, Enclosure, & Mounting | Support and enclose rotor providin | |
| 9 | Instrumentation | Provide status | NA reference only |
| 5a1 | Lubrication Supply<br><br>*LO Supply; LO Feed; LO Bearing Feed; sight* | Cool and supply lube oil | Local gravity fed reservoir of <5 gallons. sight feed oil lubricators<br>Oil cup, LO injector |
| 4a | Rotor Armature | Provide ferromagnetic concentrati | |
| 4c1 | Rotor Brushes (DC)<br><br>*Brushes & Commutator Ring* | Transmit excitation current to rotor | Brush condition is the key consideration that controls the task interval. Wear rates will be very dependent on the accumulated run time. Continuously running motors should have brush inspections at six month intervals unless operating history indicates otherwise. Standby motors could be inspected at 4 year intervals provided they are run or tested occasionally to prevent oxidation of the commutator / brush interface. Operating history is crucial to finding the appropriate intervals. |
| 4c | Rotor Commutator (DC) | Convey current to rotor changing f | |
| 4d | Rotor Shaft | Provide magnetic torque excitation | |
| 4b | Rotor Windings (DC) | Develop rotor magnetic torque for l | Motor Performance Testing should be performed at every other outage, at 3 years, but only for critical motors with power above 20 HP. Performed at all for critical motors, the Motor Performance Testing interval should be 3 to 5 years. |
| 7 | Space Heaters | Keep motor winding temperature a | |

FIG.23E

| | | | |
|---|---|---|---|
| 2a | Stator - Windings | Structurally constrain stator windin | For V3.0 this task has been added at the suggestion EPRI Maintenance and Diagnostic Center, which also recommends that the task be performed annually for non-critical motors. |
| | | | In the case of standby motors, thermography should be performed after the motor has been running at rated speed for four hours in order to reach a stable operating temperature and hence give valid measurements. |
| | | | When thermocouples or RTDs are installed, direct bearing temperature indication is likely to be monitored frequently, and vibration monitoring provides an independent indication of bearing wear. |
| | *Conductor; Windings & Core* | | |

Work Orders

| | Workscope | Summary | |
|---|---|---|---|
| 1 | Bridge Test DC MOTOR | | 3 A (annual) |
| | Detects high resistance electrical connections. | This task has been changed in Version 3.1 to focus on a bridge measurement of the resistance of connections and windings. | |
| | | The Bridge Test is capable of an accurate measurement of the resistance of windings, feeder cables, and motor leads. Winding to winding shorts can be detected as well as poor connections. | |
| 2 | Check LO reservor DC MOTOR | | 4 M (month) |
| | Checks intermediate interval motor checks | | |
| 3 | Maintain Bushes DC MOTOR BRUS | | 6 M (month) |
| | Inspects the brushes and commutator. | Brush Maintenance is an inspection of the brushes and commutator. A worn, corroded, or loose brush holder or commutator, is likely to be revealed by erratic operation and excessive sparking. To some degree, contaminated or degraded insulation may also be observable. | |
| 4 | Maintain DC DC MOTOR | | 10 A (annual) |
| | Long term maintenance activity before replacement | | |
| 5 | Monitor Acoustics DC MOTOR | | 3 M (month) |
| | Identifies grease-related bearing wear and other rotating component problems. | Acoustic monitoring should be effective for addressing some causes of wear in bearings of all types, especially those caused by a lack of grease, or an excess of grease. However, industry experience with this technology is limited, suggesting that information in the database on this technology may be subject to change. | |

FIG.23F

| | | |
|---|---|---|
| 6 | Operations Rounds DC MOTOR | 1 SH (shift) |
| | Identifies visible grease leakage, and air flow blockages. | Focus on visible grease leakage, either from worn bearing seals, failed gaskets, or from the use of excessive grease. Other grease related problems such as degraded or insufficient grease, or the use of an incorrect type of grease, may also be observable. External visual inspection is also effective for detecting blocked air inlets. |
| | | Damaged junction boxes, conduits, or seal flex might also be visible. Failed banding will usually be detectable during the inspection by the audible noise it produces. Improper length or position of brushes and excessive sparking between brushes and commutator are not generally observable without removing an inspection plate. Consequently these aspects of inspection are included in the brush maintenance task. |
| | | The inspection also includes general observation for loose, missing, or damaged parts, and listening for unusual noises or vibrations, e.g. from mechanical interference between armature and stator. |
| 7 | Sys Engr Wlkdwn DC MOTOR | 3 M (month) |
| | Visual inspection indicates grease leakage and air flow blockages. | This inspection focuses mainly on visible indications of leakage of grease, either from worn bearing seals, failed gaskets, or from the use of excessive grease. Other grease related problems such as degraded or insufficient grease, or the use of an incorrect type of grease, may also be observable. External visual inspection is also effective for detecting blocked air inlets. |
| | | Damaged junction boxes, conduits, or seal flex might also be visible. Failed banding will usually be detectable during the inspection by the audible noise it produces. Improper length or position of brushes and excessive sparking between brushes and commutator are not generally observable without removing an inspection plate. Consequently these aspects of inspection are included in the brush maintenance task. |
| | | The inspection also includes general observation for loose, missing, or damaged parts, and listening for unusual noises or vibrations, e.g. from mechanical interference between armature and stator. |
| 8 | Test Performance DC MOTOR | 3 A (annual) |
| | Ensures that motor electrical characteristics are within specifications, diagnosing many problems. | Motor Performance Testing addresses a wide range of degraded electrical conditions. The best procedures and testing equipment provide information about motor performance as well as motor condition. |
| 9 | Thermography DC MOTOR | 6 M (month) |
| | Detects exposed electrical connection overheating, bearing overheating, and air passage pluggage. | The main application of thermography is to provide indication of the condition of exposed electrical connections, and to compliment other indications of bearing wear. Thermography plays a backup role when bearing temperature is directly measured by in-situ RTDs or thermocouples. Other indications of bearing wear are oil and vibration analysis. Thermography can usually only give an indication of increased temperatures in the general region of the bearing casing, where this is accessible. Additionally, thermography can detect clogged air passages and screens. |
| 10 | Unassigned PM Tasks | 0 |
| | Do not delete this placeholder record. | |

FIG.23G

| | | | |
|---|---|---|---|
| 11 | Vibration Monitor DC MOTOR | | 3 M (month) |
| | Identifies rotating component bearing wear and rotor unbalance. | Vibration monitoring is very effective for addressing all the causes of wear in anti-friction bearings. Additionally, vibration monitoring addresses all causes of failures originating in the shaft, all causes of failures originating in the armature, and a worn or loose commutator. Cracks, weld failures, and deformation in the frame, enclosure and mounting, soft foot, and other deformation or misalignment causing or caused by failure of machine fits, are also likely to result in detectable vibration. | |

Work Orders (workscope)

| | Task | Part | Failure |
|---|---|---|---|
| 1 | Vibration Monitor DC MOTOR | | 3 M (month) |
| | 1  Monitor vibration | Frame, Enclosure, & Mo | Soft foot |
| | 2 | Stator - Windings | Loose blocking and bracing |
| 2 | Bridge Test DC MOTOR | | 3 A (annual) |
| | 1  Perform megger test | Rotor Windings (DC) | Insulation breakdown |
| | 2  Perform Bridge phase balance test | Stator - Windings | Insulation degradation |
| 3 | Sys Engr Wlkdwn DC MOTOR | | 3 M (month) |
| | 1  Check bearing temperature | Bearing Lubrication Oil | Inadequate lubricant film |
| | 2  Monitor vibration | Rotor Shaft | Shaft cracking |
| | 3  Trend vibration | Rotor Shaft | Journal & coupling wear |
| 4 | Maintain Bushes DC MOTOR BRUSHES | | 6 M (month) |
| | 1  Inspect brushes | Rotor Commutator (DC) | Worn /galling |
| | 2  Replace brushes | Rotor Commutator (DC) | Worn /galling |
| 5 | Thermography DC MOTOR | | 6 M (month) |
| | 1  Perform thermographic survey | Stator - Windings | Insulation degradation |
| 6 | Test Performance DC MOTOR | | 3 A (annual) |
| | 1  Perform megger test | Feeder Cables and Moto | Insulation cracking |
| | 2  Test low oil pressure lamp "on" | Instrumentation | Lube oil pressure low |
| 7 | Monitor Acoustics DC MOTOR | | 3 M (month) |
| | 1  Check temperature | Bearing Seals | Softened wear, temperature |
| | 2  Monitor vibration (hand held) | Bearings: Journal | Wear |
| 8 | Operations Rounds DC MOTOR | | 1 SH (shift) |
| | 1  Clean motor screen | Air Inlet Openings | Clogged air passages /scree |
| | 2  Inspect motor inlet screens for pluggage | Air Inlet Openings | Clogged air passages /scree |
| | 3  Check leakage | Bearing Seals | Wear aging |
| | 4  Monitor vibration | Bearings: Antifriction | Wear rough |
| | 5  Monitor accoustically | Bearings: Journal | Wear rough |
| | 6  Inspect inlet passages for plugagge | Fan & Cooling Air Filter | Clogged air passages /scree |
| | 7  Change inlet air filters | Fan & Cooling Air Filter | Clogged air passages /scree |
| | 8  Check inlet air filter DP | Fan & Cooling Air Filter | Clogged air passages /scree |
| | 9  Monitor temperature alarms | Frame, Enclosure, & Mo | Clogged air passages /scree |
| | 10 Check lubricator sight glass oil level | Lubrication Supply | Low lubricator level |

FIG.23H

| | | | | |
|---|---|---|---|---|
| | 11 Monitor vibration (hand held) | Rotor Armature | Fatigue | |
| | 12 Inspect visually | Rotor Commutator (DC) | Brush holder vibration/Wor | |
| | 13 | Rotor Commutator (DC) | Worn or damaged | |
| | 14 Monitor accoustically | Rotor Shaft | Journal & coupling wear | |
| | 15 Monitor vibration | Rotor Windings (DC) | Insulation softening | |
| | 16 Check heater "ON" lights | Space Heaters | Open element | |
| | 17 Monitor accoustically | Stator - Windings | Loose blocking and bracing | |
| 9 | Check LO reservor DC MOTOR | | 4 M (month) | |
| | 1 Sample lube oil | Bearing Lubrication Oil | Dirty-dissolved metal/oxida | |
| | 2 | Bearing Lubrication Oil | Wear particles excessive | |
| | 3 Visually check lube oil | Bearings: Journal | Wear erosion | |
| | 4 Check lube oil level | Instrumentation | Lube oil level low/high faile | |
| | 5 Replenish lube oil | Lubrication Supply | Low lubricator level | |
| | 6 Check oil feed visually | Lubrication Supply | Loose feed tube | |
| | 7 Sample lube oil | Rotor Shaft | Wear (Journal & coupling a | |
| 10 | Maintain DC DC MOTOR | | 10 A (annual) | |
| | 1 Check temperature sensors "on: | Instrumentation | Winding temperature loop f | |
| | 2 Check vibration sensor loop "on" | Instrumentation | Vibration sensor loop failur | |
| | 3 Check temperature sensors "on" | Instrumentation | Winding temperature sensor | |
| | 4 Inspect visually | Stator - Windings | Surge ring support bracket c | |
| | 5 Coat with Glyptol | Stator - Windings | End turn fatigue | |
| | 6 Perform Hi-pot DC resistance test | Stator - Windings | Insulation degradation | |

Authorties

| Application Tag(s) | | Component Name | SYSTEM | | | |
|---|---|---|---|---|---|---|
| MOT | MOT-1 | Motor - Direct Current | | 39 | 38870 ☑ | |
| Applications/Users | | | | | | |
| | MTR 24-2 | 22 CW PMP | US Motors | | CW | Circ Wat |
| | MTR 24-2 | 22 CW PMP | 0 | | | |
| | MTR 23-3 | 21 CW PMP | 0 | | | |
| | MTR 14-8 | 12 CW PMP | 0 | | | |
| | MTR 13-10 | 11 CW PMP | 0 | | | |

FIG.23I

| Template | PUMP-2 | 45 |
|---|---|---|

Pump - Positive Dispacement

| Type | PUMP | Manufacturer | Vickers |
|---|---|---|---|
| Subtype | HPD | | |

Details

Component Background

| Type | Subtype | No. | Name | |
|---|---|---|---|---|
| PUMP | HPD | PUMP-2 | Pump - Positive Displace | |
| Manuf | Model | | Owner | Admin |
| Vickers | 45 | | | |

Brief
Pump - Positive Displacement

Complete Description
Multiple cylinder variable stroke pump with wobbler (wobble plate) control. Alternatively variable speed drive.

Scope
The expert panel typical positive displacement pump has:
· Pump, power end and fluid cylinder
· Suction Stabilizer
· Discharge Dampener
· Pump coupling
· Pump gear reducer

Reference/Open Items
1. "Centrifugal and Positive Displacement Charging Pump Maintenance Guide", EPRI (NMAC) TR-107252, October 1997,
2. NRC Information Notice 94-29, "Charging Pump Trip During a Loss-of-Coolant Event caused by Low Suction Pressure".
3. ASME OM Code-1995, "Code for Operation and Maintenance of Nuclear Power Plants", Subsection ISTB, Part 6 - "Inservice Testing of Pumps in Light-Water Reactor Plants".

Additional Basis Information
Expert-identified common dominant failure location/mechanisms:
· Packing leaks
· Damaged valve assemblies
· Damaged oil delivery components
· Cracked fluid cylinders

Equipment Name
· Pump, power end and fluid cylinder
· Suction Stabilizer
· Discharge Dampener
· Pump coupling
· Pump gear reducer
· Oil cooler heat exchanger
· Oil filters, if present
· Packing coolant/lubrication piping and supply tank

FIG.24A

Functions/Failures

| Rank | Component Function(s)/Failures | Consequences | Degree |
|---|---|---|---|
| 1 | Provide high pressure water (fluid) efficiently<br>Fails to provide any high pressure water (fluid) | Fails to control flow | Complete |
| 2 | Fails to contain high pressure water (fluid) efficiently | Vibrates excessively | Partial |
| 3 | Fails to contain high pressure water (fluid) | Leaks | Partial |
| 4 | Fails to provide any high pressure water (fluid) | Fails to deliver flow | Complete |
| 5 |  | Bound elements | Complete |
| 6 | Fails to provide high pressure water (fluid) at flow efficiently | Fails to deliver flow at pressure | Partial |
| 7 | Provide high pressure water flow status<br>Fails to provide high pressure water flow status | Failed bearing/pressure sensors | Partial |

Parts

| No. | Part/Alternate Name | Functions | Notes |
|---|---|---|---|
| 1a | Air Filter | Removes grit from air causing met | |
| 1 | Body Housing | Support internal parts retaining flui | The recommended interval for Performance Monitoring is 3 months. Even more frequent performance monitoring (i.e. weekly) would be needed to have a good chance of completely avoiding valve degradation. Because of the possibility of rapid valve degradation, this task may not avoid the necessity for taking a mid-cycle outage to repair the valves, when dependent upon a single pump, regardless of the interval at which it is performed. After refurbishment a typical value of efficiency is 95%, whereas valve replacement is indicated when the efficiency has fallen to around 87% (at least for Union model QX-300 Quintuplex). |

FIG.24B

| | | | |
|---|---|---|---|
| 3c1 | Coupling | Connect pump load transmitting dr | Task should be moderately effective because the frequencies differ from pump vibrations which would otherwise predominate. This task mainly addresses the condition of couplings. The intervals are not directly determined by the failure mode data but many random mechanisms are addressed.<br>Continuously operating critical pumps are recommended to have a coupling inspection at 2 years regardless of whether they run continuously or are alternated. Vibration monitoring will not give useful information on alignment or coupling wear because of the high intrinsic vibration levels with these pumps. Thermography would provide indication of a coupling running hot, but was not thought to be sufficiently applicable and cost-effective for inclusion in the PM program as a regularly scheduled task.<br>This task is focused entirely on inspection of the coupling. The task interval is not strongly determined by the failure mode data. |
| | Flex, Flanged or Gear | | |
| 2 | Drive Mechanism Geareducer | Connect motor/prime mover to co | Experts recommended oil analysis every six months for continuously running or alternated critical pumps. This assumes that analysis and evaluation are carried out in timely manner. |
| | Main Bull/Pinions | | |
| 5 | Fluid Cylinder | Compression or combustion locati | Degradation mechanisms and time scales suggest that the Fluid Cylinder Inspection is likely to be required after 1 year of operation. The deterioration rate of inlet and outlet valves is sufficiently rapid after onset, and the predictive capability of Performance Monitoring is sufficiently weak, that positive displacement pump outages in order to perform the Fluid Cylinder Inspection, may not be avoidable between refueling cycles unless a redundant pump is available. When a redundant pump is not available consideration should be given to scheduling the Fluid Cylinder Inspection as a time-directed task with an interval less than 6 years. Carrying out the Performance Monitoring task more frequently (perhaps weekly) does not avoid the problem.<br><br>If good performance of packing, valves, and oil seals enables the Fluid Cylinder Inspection to be done only every 3 to 6 years, the valves, oil seals, plunger, and oil pump (if external) should be replaced regardless of condition, especially if a redundant pump is not available. |
| | Water or Oil, typically | | |
| 6 | Fluid End Gaskets & Seals | Seal pressure components | |
| 5a | Inlet and Outlet Valves & Seats | Isolate pump for maintenance | |

FIG.24C

| | | | |
|---|---|---|---|
| 9 | Loading Controls | Control loading | Task is performed at least once per day. |
| 2a | Main Bearings | Rotate closure and trip mechanis | Task provides assurance that the Power End Inspection can be reached at 6 years without undue wear on the above components. The Expert Panel thought that a 2 year interval for the Internal Visual Inspection would provide this assurance in a cost-effective manner. |
| | *Crosshead bearings* | | |
| 3a | Main Shaft (Engine Driven) | Transmit torque | |
| 3 | Motor/Power End | Drive motor-end | Task should be moderately effective whenever a direct view can be obtained. This task is focused on the detection of hot spots. The intervals are not directly determined by the failure mode data but many random mechanisms are addressed. |
| 4d | Oil Reservoir Breather | Allow air equalization for pressure | |
| 4 | Oil & Reservioir | Supply clean oil to demand | A task interval of 6 years adequately addresses the above failure mechanisms. Oil Sampling and the Internal Visual Inspection provide reasonable assurance of avoiding failures from random effects at earlier times. |
| 4c | Oil (Fluid) Cooler | Cool clean oil supply | |
| 4b | Oil Filter | Clean oil particulates | Filter replacement is recommended as a scheduled task at 6 months for continuously operating or alternated pumps. |
| 4a | Oil Pump & Lubricator | Lubricate pump bearings & equip | |
| | *Grease charging lubricator, box lubricator* | | |
| 5b | Packing | Seal Pneumatic air in cylinder | |
| 5b2 | Packing Seal Water | Seal bearing seal water in cylinde | |
| 2b | Pinion Shaft Bearings | Align pinion driver stage | |
| 3b | Power End Gaskets & Seals | Seal power end of equipment | |
| 6b | Relief Valve Ports, O-ring seal l | Provide overpressure relief path | |
| 5b1 | Stuffing Box | Isolate process fluid from environ | |
| 5d | Suction/Discharge Dampeners | Dampen pressure pulsation shock | Most installations have discharge dampener; many suction, too. |
| | *Accumulators, Stabalizers, Pulsation Dampeners* | | |
| 5c | Valves, Plunger and Seals | Operate compressor stroke seque | |

Work Orders

FIG.24D

| | Workscope | Summary | |
|---|---|---|---|
| 1 | Coupling Inspection COUPLING | | 2 A (annual) |
| | Inspects coupling for seal failure and noise. Can be performed as rounds/performance monitoring. | As the name implies this task is focused entirely on inspection for lubrication leaks and wear of the flexible grid type and geared type of pump/motor couplings, and on distortion or cracking of the shims on the shim pack types. | |
| 2 | Fluid Cylinder Inspection PUMP | | 4 A (annual) |
| | Inspects cylinder head check valves, oil seal leaks, packing leaks, and cracked fluid cylinders, and to inspect the packing cooling/lubricating system integrity. | The Fluid Cylinder Inspection provides an opportunity to inspect and repair cylinder head check valves, leaks from oil seals, leaks from packing, and cracked fluid cylinders, and to inspect the integrity of the packing cooling/lubricating system. This is an on-condition task which may be triggered by observation of leaks during operator rounds, by audible noise and results of performance monitoring with respect to worn or broken valves, and by leakage, performance monitoring, or loss of fluid inventory in the case of a cracked fluid cylinder. | |
| 3 | Inter Visual Inspect PUMP | | 2 A (annual) |
| | Assess oil pump drive chain and sprockets, thrust bearing, main gear and pinion, and visible gaskets. Major work for continuously running pumps. | Internal Visual Inspection is an internal inspection performed when the power end large inspection cover has been removed. The main objectives of this task are to assess the condition of the oil pump drive chain and sprockets, and the tightness of the oil pump mounting bracket in a pressure lubricated system, as well as to assess the condition of the thrust bearing, main gear and pinion, and gaskets that are visible. | |
| 4 | Oil Analysis PUMP | | 6 M (month) |
| | Detect wear particles or other contaminants in the oil, and measure oil quality. | Oil analysis is focused on processes that result in wear particles or other contaminants entering the oil and on degradation of the lubricating properties of the oil. This primarily addresses wear and scoring of the cross-head to cross-head surfaces and asymmetric wear of the main gear and pinion teeth, as well as deterioration of bearing oil seals, and wear of the oil pump, drive chain and sprockets in a pressure lubricated system. Wear of the crosshead pin and bearing, main crankshaft bearings, connecting rod bearings, pinion shaft and bearing, and thrust bearing, can also be detected. | |
| 5 | Oil Filter Replacement PUMP/MOTO | | 6 M (month) |
| | Focuses on oil filter clogging and lubricant contamination. | This task focuses entirely on the condition of the lubrication system. Items to observe are a clogged oil filter and contamination of the lubricant. | |
| 6 | Operations Rounds PUMP | | 1 SH (shift) |
| | Observe leaks, unusual noise, loose, missing, or damaged components. For pumps in daily use (like charging pumps) observation is effective for many random degradation mechanisms. | Observe leaks of water or oil, unusual noises, and obviously loose, missing, or damaged fasteners and hardware. It also provides an opportunity to verify that the oil delivery system and packing cooling system are operating within normal limits. | |
| 7 | Performance Monitor PUMP | | 3 M (month) |
| | Inlet (suction)/ outlet (discharge) valve cracking and wear, valve seats and springs, and fluid cylinder cracking. | Performance Monitoring mainly addresses cracking and wear of the inlet (suction) and outlet (discharge) valves, valve seats and springs, and cracking of the fluid cylinder. Worn valve guides may also be detected but these are only likely to be common occurrences in specific applications. | |

FIG.24E

8 Power End/Frame Inspect MOTOR/E  6 A (annual)
   Major pump power end work. This task focuses principally on the condition of the oil delivery system: oil pump, drive chain, and sprockets in a pressure lubricated system, or the gear driven external oil pump. Other important components addressed are the crosshead, including the crosshead to stub fit, bearings, crankshaft, gears, gaskets, and the oil heat exchanger, if present..

9 Thermography PUMP/MOTOR  6 M (month)
   Detects hot spots, addressing many mechanisms. Thermography will detect hot spots which cause cylinder damage and degradation of packing cooling.

10 Unassigned PM Tasks  0
   Do not delete this placeholder record.

11 Vibrtn Analysis PUMP/MOTOR  6 M (month)
   Addresses coupling condition. Vibration Analysis can be effective for detecting distorted and cracked shims in couplings, grid type coupling wear, and gear type coupling degradation.

Work Orders (workscope)

| | Task | Part | Failure |
|---|---|---|---|
| 1 | Oil Analysis PUMP | | 6 M (month) |
| | 1 Sample fluid for water | Oil (Fluid) Cooler | Tube roll/tube leaks |
| | 2 Sample cooling water for oil contamination | Oil (Fluid) Cooler | Tube roll/tube leaks |
| 2 | Performance Monitor PUMP | | 3 M (month) |
| | 1 Monitor noise (accoustically) | Coupling | Lube leakage |
| | 2 Check slipping noise | Coupling | Wear |
| | 3 Check discharge pressure | Fluid Cylinder | Scored liner/bore taper |
| | 4 Check crankcase housing contamination | Inlet and Outlet Valves | Valve guide wear |
| | 5 Trend discharge pressure | Inlet and Outlet Valves | Valve seat wear |
| | 6 Test cooler heat transfer | Oil (Fluid) Cooler | Fouled tubes |
| | 7 Check pump output | Oil Pump & Lubricator | Pump cylinder |
| | 8 Check discharge fluid contamination | Valves, Plunger and Sea | Fluid Seal Leakage |
| | 9 Trend discharge pressure | Valves, Plunger and Sea | Valve seat wear |
| 3 | Oil Filter Replacement PUMP/MOTOR | | 6 M (month) |
| | 1 Change breather | Oil Reservoir Breather | Plugs |
| | 2 Replace filter | Oil Filter | Plugged |
| | 3 Replace packing | Stuffing Box | Packing set |
| 4 | Inter Visual Inspect PUMP | | 2 A (annual) |
| | 1 Replace coupling | Coupling | Wear |
| | 2 Replace/rework liner | Fluid Cylinder | Scored liner/bore taper |
| | 3 Calibrate control loop | Loading Controls | Fails to control |
| | 4 Lubricate bearings | Motor/Power End | Motor bearings fail |
| | 5 Replace motor | Motor/Power End | Motor failure |
| | 6 Drain reservoir | Oil & Reservior | Oil sludge |

FIG.24F

|   |   |   |   |   |
|---|---|---|---|---|
|   | 7 | Inspect cooler | Oil (Fluid) Cooler | Tube roll/tube leaks |
|   | 8 | Replace packing | Packing | Wear |
|   | 9 | Replace bearings | Pinion Shaft Bearings | Bearing failure |
|   | 10 | Test relief setpoint | Relief Valve Ports, O-ri | Setpoint drift out-of-spec |
|   | 11 | Check accumulator gas precharge | Suction/Discharge Dam | Lose precharge |
|   | 12 | Check accumulator drains for liquid | Suction/Discharge Dam | Ruptured bladder |
|   | 13 | Replace seals | Valves, Plunger and Sea | Fluid Seal Leakage |
| 5 | Fluid Cylinder Inspection PUMP | | | 4 A (annual) |
|   | 1 | Calibrate relief lift setpoint | Relief Valve Ports, O-ri | Setpoint drift out-of-spec |
|   | 2 | Check temperature alarm | Valves, Plunger and Sea | Spring cracking |
| 6 | Power End/Frame Inspect MOTOR/ENGINE | | | 6 A (annual) |
|   | 1 | Change breather | Air Filter | Plugged housing breathing |
|   | 2 | NDE Shaft | Main Shaft (Engine Driv | Fatigue cracking |
|   | 3 | Replace gaskets, O-rings and other soft parts | Power End Gaskets & S | Compression set |
| 7 | Operations Rounds PUMP | | | 1 SH (shift) |
|   | 1 | Check sealed couplings for leakage | Coupling | Lube leakage |
|   | 2 | Monitor noise | Coupling | Flex failure |
|   | 3 | Check discharge pressure | Fluid Cylinder | Low compression |
|   | 4 | Check temperature alarm | Main Bearings | Inadequate Lube |
|   | 5 | Monitor temperature alarm | Main Bearings | Inadequate Lube |
|   | 6 | Check lube flow | Main Bearings | Inadequate Lube |
|   | 7 | Monitor temperature alarms | Motor/Power End | Motor bearings fail |
|   | 8 |   | Motor/Power End | Motor bearings fail |
|   | 9 | Check lube oil level | Oil & Reservior | Low oil level |
|   | 10 | Check lubricator operation | Oil Pump & Lubricator | Lubricator fails to advance |
|   | 11 | Check shaft leakage | Packing | Wear |
|   | 12 | Check seal water flow | Packing Seal Water | Inadequate flow |
|   | 13 | Monitor accoustically | Valves, Plunger and Sea | Spring cracking |
|   | 14 | Monitor temperature alarms | Valves, Plunger and Sea | Spring cracking |
| 8 | Thermography PUMP/MOTOR | | | 6 M (month) |
|   | 1 | Perform thermographic survey | Fluid End Gaskets & Se | Internal leakage |
|   | 2 | Perform thermogrphic survey | Main Bearings | Inadequate Lube |
| 9 | Vibrtn Analysis PUMP/MOTOR | | | 6 M (month) |
|   | 1 | Check vibration | Body Housing | Loose grout foundation |
|   | 2 | Vibration monitoring | Drive Mechanism Geare | Geartooth failure |
|   | 3 | Monitor vibration | Main Bearings | Excessive wear |
|   | 4 | Vibration monitoring | Pinion Shaft Bearings | Bearing failure |
|   | 5 | Check flow accoustically | Suction/Discharge Dam | Lose precharge |

Authorties

FIG.24G

| Application Tag(s) | | Component Name | SYSTEM | | |
|---|---|---|---|---|---|
| PUMP | PUMP-2 | Pump - Positive Displacement | | 45 | 139188 ☑ |
| Applications/Users | | | | | |
| | 245-041 | 21 CHG PMP | Vickers | VC | Chemica |
| | 245-043 | 23 CHG PMP | 0 | | |
| | 245-042 | 22 CHG PMP | 0 | | |
| | 245-041 | 21 CHG PMP | 0 | | |
| | 145-043 | 13 CHG PMP | 0 | | |
| | 145-042 | 12 CHG PMP | 0 | | |
| | 145-041 | 11 CHG PMP | 0 | | |

FIG.24H

RELIABILITY TOOLS FOR COMPLEX SYSTEMS

CROSS REFERENCE TO RELATED APPLICATIONS

This application claims the benefit of U.S. Provisional Application No. 60/731,324, filed on Oct. 28, 2005, the entire disclosure of which is hereby incorporated herein by reference.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

FIELD

The present invention is related to the development and organization of maintenance programs or tools for complex systems.

BACKGROUND

The maintenance of production systems is important in order to ensure production efficiency and safety. In connection with complex production systems, such as nuclear power plants, scheduled maintenance and repair procedures, usually implemented in connection with a computerized maintenance management system (CMMS), are often voluminous and unwieldy. In addition, procedures for responding to failures within a complex plant prepared in anticipation of certain failures (e.g., equipment degradation), are often performed without an appreciation of the impact of the failure on the stated safety, operating or cost performance goals of the plant. As a result, the preventive and corrective maintenance procedures associated with complex plants using conventional computerized maintenance management methods have been inefficient and/or ineffective.

The traditional approach to performing maintenance and responding to failures in complex plants or systems has been to apply maintenance and repair procedures without an appreciation of the context in which the maintenance or repair will occur. For example, a typical system may address a failure of a valve (e.g. a leak) by calling for replacement of that valve. However, there is usually little or no concern for the context in which the component (here a valve) operates. For instance, a valve may perform an important safety function or may control the flow of a dangerous substance, and may therefore be critical to the safe operation of the plant. Alternatively, it may be part of the water supply system used to wash the plant floors, and therefore a leak in the valve is trivial. However, because systems have not generally considered the context in which systems and components in a plant function, the limited maintenance and repair resources of a plant may quickly become overwhelmed by long lists of tasks, many of which may be relatively unimportant to the safe or efficient operation of the plant.

Another aspect of maintaining complex systems is tracking the changes that inevitably occur to the system over time, and making appropriate adjustments to maintenance and repair procedures affected by those changes. For example, a component in a plant may be replaced by a component that performs an identical function, but that has a very different design requiring different maintenance procedures. Conventional systems have typically not accommodated or required notes or the creation of historical records for justifying and documenting such changes. Therefore, changed maintenance or repair procedures may not be reflected by the computerized maintenance management system, or unjustified changes may be questioned by maintenance personnel, resulting in inappropriate maintenance or repair.

In order to efficiently allow for a maintenance program to model a complex system, it is useful to provide ready-made component descriptions that can be included in the overall system model. Although such descriptions have been available, they have not addressed adjustments or modifications that are necessitated by the context in which the component functions within the plant. In general, the context of a component is related to the function that the component provides in relation to the system in which the component is included, where the system defines, at least in part, the stress, environment, risk and service demand placed on the component. As a result, the maintenance and repair procedures that are associated with the component descriptions fail to take into account the actual operating conditions and the ramifications of failure or particular failure modes of the associated components. This again can result in unnecessary or inappropriate maintenance and repair procedures for components in a plant. In addition, where modifications to models of plant components are necessary, conventional computerized maintenance management systems have been unable to efficiently identify symmetries in the subject plant in order to facilitate the appropriate reuse of customized models of plant components. Conventional management systems have also been of limited assistance in determining what spares should be stocked, and what spares do not need to be stocked, in order to facilitate the uninterrupted operation of a plant, without maintaining an unreasonable inventory of spares.

SUMMARY

Embodiments of the present invention are directed to solving these and other problems and disadvantages of the prior art. In accordance with embodiments of the present invention, a master equipment list provides a list of complex plant components. A number of systems included in the plant are identified, and each of the components included in the master equipment list is assigned to at least one of the identified systems. A template or model is associated with at least some of the components. The template or model includes or references maintenance and repair procedures associated with the modeled component.

In accordance with embodiments of the present invention, the identification of systems within a complex plant comprises an identification of the criticality of each system to the overall plant. The identification of a system's criticality with respect to the complex plant can comprise identifying the safety, production operations or cost effects of a failure of the system. Furthermore, the criticality of the systems within the complex plant can be ranked. For example, a system that is critical to the safe operation of a plant is more critical than a system that is critical to the production operations of the plant, which is in turn more critical than a system that is critical to the cost effective operation of the plant. In accordance with embodiments of the present invention, the identification of the criticality of a system provides a context for that system within the complex plant. This context can then be used to identify critical components, and to assist in determining appropriate maintenance and repair procedures for components within each system. In addition, this context can be used to identify critical component parts in connection with selecting spare parts that are stocked by the complex plant.

Critical components may comprise components that have a significant effect on safety, operations (production), or cost objectives should they fail. A critical part is a part of a critical component that causes the critical component to fail if the part fails. In determining whether a component is a critical component, consideration may be given to the presence of redundant components. In accordance with embodiments of the present invention, only those components identified as critical components are associated with a template. Accordingly, embodiments of the present invention recognize that an efficient and effective maintenance and repair system, hereinafter referred to as a reliability system, can be developed through intelligently excluding components that are non-critical.

A library of component templates is available for use by system operators in order to develop a model of at least some of the components in the complex plant. In particular, a user may retrieve a library template that has some correspondence to a component to be modeled. The user may then associate the library template with the particular component being modeled, creating an applied template. In addition, the user may modify the library template in order to more closely reflect the component being modified to create the applied template for that component.

In accordance with embodiments of the present invention, symmetry may be applied in order to assist in the creation of a plant model. The application of symmetry may comprise identifying groups of components within a system or within a complex plant that perform like functions. Once such groups have been identified, application templates developed for one of the groups can be used to model other of the groups, or as the basis for a model of other of the groups if modifications to the model are desired for those other groups.

Additional features and advantages of embodiments of the present invention will become more readily apparent from the following description, particularly in connection with the accompanying drawings.

BRIEF DESCRIPTION OF THE DRAWINGS

Figure 11:
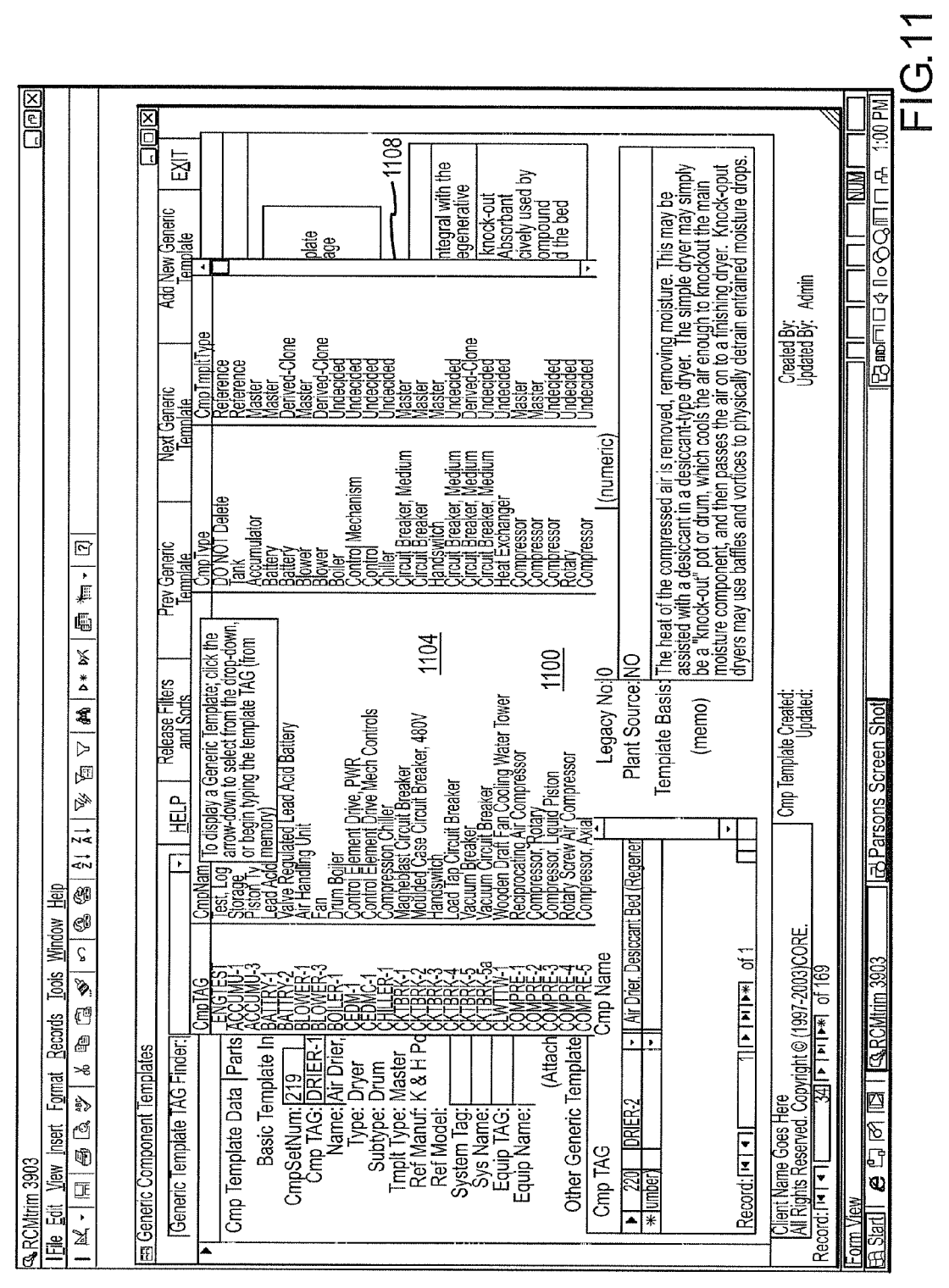

FIG. 11 is a screen shot illustrating a list of example library templates displayed to a user and available for selection in accordance with embodiments of the present invention;

FIG. 12 is a screen shot illustrating aspects of an example library template displayed to a user in accordance with embodiments of the present invention;

FIG. 13 is a screen shot illustrating a tree view of example applied templates in accordance with embodiments of the present invention;

FIG. 14 is a screen shot illustrating a tree view of parts and a display of part failures of an example component in accordance with embodiments of the present invention;

FIG. 15 is a screen shot illustrating a tree view of parts and preventive maintenance tasks in accordance with embodiments of the present invention;

FIG. 16 is a screen shot illustrating a tree view of parts and details of an example preventive maintenance task in accordance with embodiments of the present invention;

FIG. 19 is a screen shot illustrating a view of failures and parts;

FIG. 21 is a screen shot illustrating preventive maintenance tasks and associated bases;

FIGS. 22A-22L illustrate an example library template for a component;

FIGS. 23A-23I illustrate an example template for another component; and

FIGS. 24A-24H illustrate an example template for another example component.

DESCRIPTION

Figure 1:
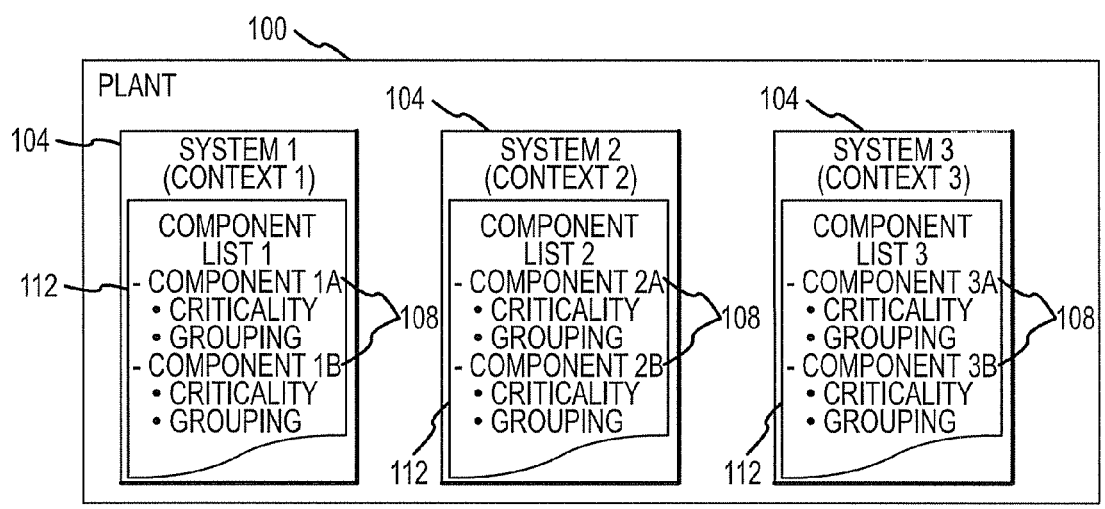
FIG. 1, is a block diagram depicting the organization of an exemplary complex plant in accordance with embodiments of the present invention.

Embodiments of the present invention are directed to the development and operation of reliability systems for the maintenance and repair of complex plants. As illustrated in FIG. 1, a complex plant 100 may be modeled as a collection or combination of a number of systems 104. As used herein, a complex plant is any system, production facility or plant that can be divided into a number of systems that each include one or more components.

In accordance with embodiments of the present invention, each of the systems 104 within the complex plant 100 is associated with a function and/or a context. In particular, the systems 104 within a complex plant 100 are the tangible assemblies that allow functions to be provided. Examples of different functions for systems 104 that can result in the assignment of different contexts to systems 104 include functions that impact the safety of the complex plant, functions that impact the operations (production) of the complex plant, and functions that impact the cost efficiency of the complex plant. In addition, each system 104 is comprised of a number of components 108. Accordingly, systems 104 may be defined as a set of components 108 that together provide an identified function within the complex plant 100. Each component of a system 104 may be included in a component list 112 for that system 104. In accordance with embodiments of the present invention, the component lists 112 may comprise or be derived from a master equipment list.

Figure 2:
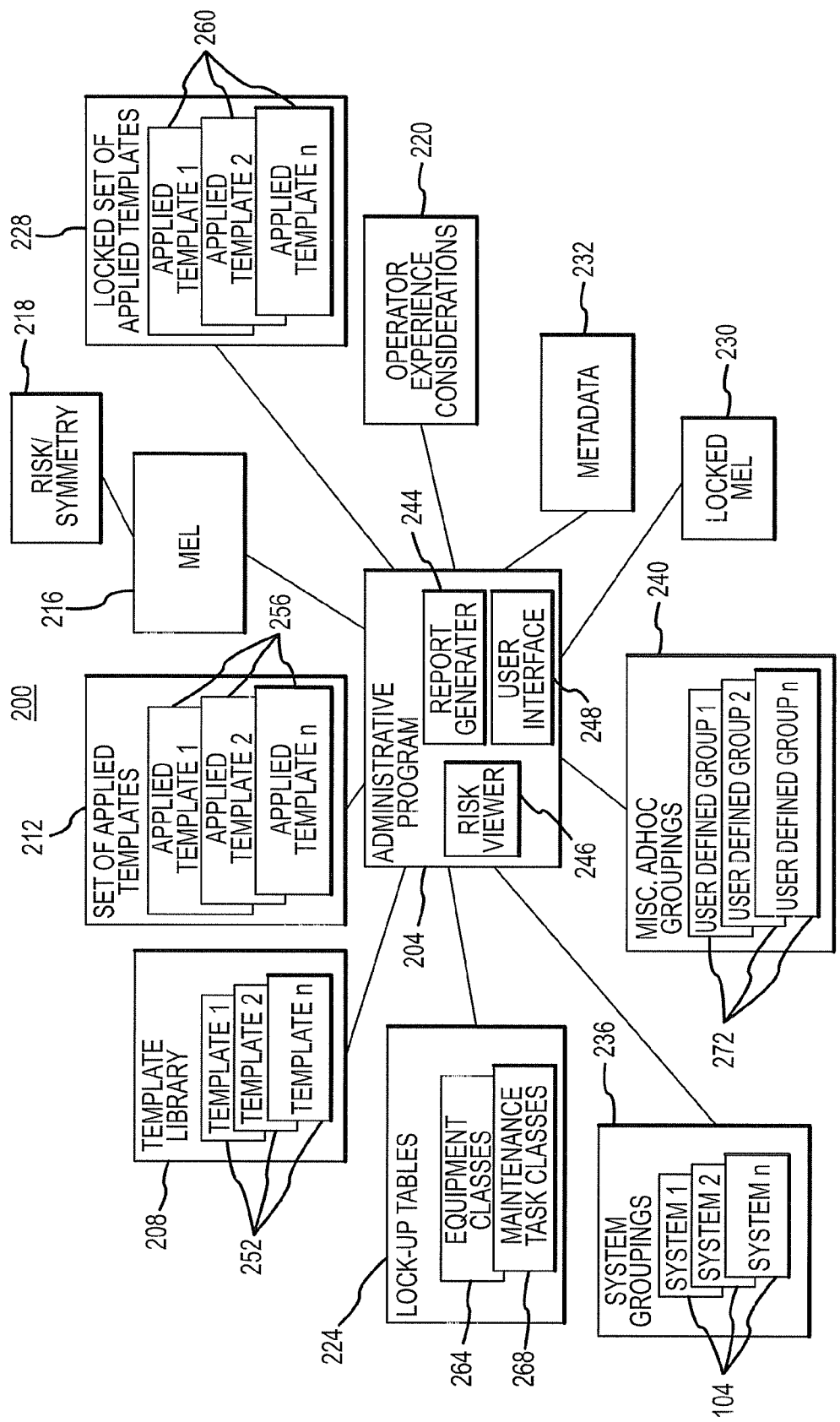
FIG. 2 is a block diagram of aspects of a reliability system in accordance with embodiments of the present invention.

With reference to FIG. 2, a reliability or maintenance tool, referred to herein as a reliability system 200 in accordance with embodiments of the present invention may include an administrative program 204 that receives or has access to a number of inputs, including data sources or data repositories. These inputs may be in the form of relational tables, look-up tables or lists (hereinafter referred to as tables). These tables can include a template library 208, a set of applied templates 212, a master equipment list (MEL) 216, risk/symmetry 218 assignments, considerations based on accumulated operator experience 220, and various look-up tables 224. Other tables that can be included in the reliability system 200 include a locked set of application templates 228, a locked master equipment list 230, metadata 232, system groupings 236, miscellaneous ad hoc groupings 240 and upload generator or table generator reconciler for preparing files in the format required by other systems that can make use of or present information from the reliability system 200.

The administrative program 204 generally functions to provide a graphic user interface (GUI) to a user, to organize and control the use and interaction of the various inputs, and to generate reports that compile information that can be presented in formats specified by the user. Accordingly, the administrative program 204 may comprise instructions or programming code executed by, for example, a general purpose computer. The administrative program 204 may also incorporate various of the inputs or other functions. For example, the administrative program 204 may incorporate a processed information report function 244, a risk viewer 246, and a user interface 248. In accordance with embodiments of the reliability system 200, the administrative program 204 functions are split between functions performed in connection with instructions executed by a server computer and functions performed in connection with instructions executed by a client computer. For example, a server management program part or server administrative program part of the administrative program 204 may run on the server computer, to ensure that clients are properly authorized to access or operate as part of the reliability system 200, and perform error recovery. The client computer may, for example, run a client administrative program comprising technical management functions of the administrative program, such as entering data, selecting and modifying templates, generating work orders, providing a user interface and other functions.

The template library 208 may comprise a collection or database of library templates 252 that can be used as models or as the basis of models for various components 112 included in a plant 100. Each library template 252 generally includes a description and/or listing of the parts of the component 112 modeled by the library template 252. More particularly, each library template 252 may comprise a description and/or listing of the critical parts of the component modeled by the library template 252. In addition, each library template 252 may include information related to failure modes of the modeled component 112, and typical approved or manufacturer recommended maintenance procedures and intervals. In accordance with embodiments of the present invention, each library template 252 included in the template library 208 is stored as a read-only copy, to prevent corruption of the library templates 252.

The set of applied templates 212 may comprise a collection or database of applied templates 256. As used herein, an applied template 256 is a template that has been selected or customized for use as a model of a component included in a complex plant 100. Accordingly, an applied template 256 may comprise a template that a user has associated with a component 112 from the master equipment list 216. Furthermore, an applied template 256 may comprise a copy of a library template 252 that has been associated with a component 112 from the master equipment list 216. In creating an applied template 256, a copy of a library template 252 may also be modified to more accurately reflect the particular characteristics or features of the modeled component 112. The creation of an applied template 256 may also include modifying a copy of a library template 252 to adjust associated maintenance and/or repair procedures and/or intervals as appropriate for the context or criticality of the modeled component 112. Furthermore, multiple applied templates 256 may be associated with a component 112. For example, multiple applied templates 256 may be used for a single component 112 when it is desirable to subpartition the component 112 because the component 112 is complex, comprised of a number of replaceable parts, comprised of a number of subsystems, or as otherwise capable of being meaningfully represented by or associated with a number of applied templates 256. An applied template 256 may also be created without borrowing from an existing library template 252 or applied template 256. Applied templates 256 may also be modified after their initial creation in order to reflect changes to the associated component 112, changes to the context or criticality or context of the associated component 112, or revisions to maintenance and repair procedures for the associated component 112. In addition, an applied template 256 may be copied for use, either unmodified or with modifications, in connection with another component 112, that is identified as being identical or similar to the component 112 associated with the copied applied template 256. In accordance with embodiments of the present invention, an applied template 256 may further comprise a set of elements of relational data stored in other of the tables. Accordingly, multiple components 112 may be associated with the same set of data comprising an applied template 256, except for data such as a tag number or other information that is unique to a particular component 112.

The master equipment list (MEL) 216 may comprise a list of all of the components 112 included in a plant 100. Alternatively, the master equipment list 216 may comprise the components included in systems of a plant that are to be modeled through the creation of application templates 256. The master equipment list 216 may comprise a list generated during design of the plant 100, or at some later time, that is downloaded or entered into the reliability system 200. In addition, the master equipment list 216 may be modified during the life of the plant 100 to track changes in installed systems and/or components.

The master equipment list 216 may also incorporate or be associated with a risk/symmetry table 218. The risk/symmetry table 218 can be used in connection with identifying the safety, operational and cost effects of a failure of each component 112 within the complex plant 100. In accordance with embodiments of the present invention, the risk/symmetry table 218 identifies such effects from a consideration of the context in which the component 112 or the system 104 in which the component is included functions. The risk/symmetry table 218 also assists in identifying or maintaining a record of those components 112 of the complex plant 100 that are critical to the functioning of the system 104 of which they are a part. A component 112 is critical if a failure of that component 112 directly affects the safety, operational or cost performance of the complex plant 100. In addition the risk/symmetry table 218 may take into account the existence (or not) of redundancies in characterizing the risk or criticality to associate with the failure of a particular component 112. Where redundancies exist, a component 112 may be considered non-critical. A decision to treat a particular component 112 as non-critical may be recorded in this risk/symmetry table 218. The identification of symmetries allows one description or template 256 of a replicated component 112 to be used for all of the copies or instances of that component 112, with or without modifications. Identified symmetries can therefore be recorded in the risk/symmetry map or table 218 to improve the efficiency and user friendliness of the reliability system 200. In accordance with embodiments of the present invention, every component 112 included in the MEL 216 for a complete plant 100 is included or accounted for in the risk/symmetry table 218.

In accordance with further embodiments of the present invention, an operator experience considerations table 220 maintains information related to operating experience regarding systems 104 and/or components 112. Examples of operating experience considerations that may be maintained in the operator experience considerations table 220 include maintenance or repair procedures that are in addition to or are different than manufacturer recommended procedures for particular components 112. Furthermore, such operator considerations may apply or be limited to particular components 112 that are operated or used in particular contexts or systems 104. Parts or components that have failed in other complex plants are examples of particular items that can be included in operating experience considerations.

In general, the look-up tables 224 comprise a number of tables describing different aspects of a component 112 represented by a template, including an applied template 256. Examples of the tables that may be included in the look-up tables 224 include equipment class tables 264, and maintenance task class tables 268. Other examples of tables that may be included in the look-up tables 224 include tables of common parts, component or part failure modes, tests, preventive maintenance justifications, cost estimation and industry operating events. By referencing the look-up tables 224 and/or other tables, applied templates 256 can be expressed, at least in part, as a set of elements of relational data. As can be appreciated by one of skill in the art, such a structure can speed data entry and increase database (and therefore reliability system 200) efficiency, by referencing common data, rather than complete replications of such data.

The locked set of applied templates table 228 allows for versioning of the complex plant 100 model represented through the reliability system 200. In particular, a set of read only or locked applied templates 260 may be maintained in the locked set of applied templates 228. As different versions of the complex plant 100 model are developed, they may be stored as different sets of locked applied templates 260 in the locked set of applied templates 228 table, or in other locked sets of applied templates tables 228.

The locked master equipment list table 230 allows for versioning of the master equipment list used in connection with the development of sets of applied templates 256, and of sets of locked applied templates 260. The locked master equipment list table 230 can maintain a number of different master equipment list versions, or different versions can be stored as part of different locked master equipment list tables 230.

The meta data table 232 generally maintains information related to the classification of tasks, the classification of component types 112, the classification of system 104 functions and contexts, and/or other information about items or categories of information within the reliability system 200. Accordingly, the meta data table 232 may serve as a repository for reference information.

The system groupings table 236 maintains information regarding the identification of different functions or systems 104 within the complex plant 100 modeled by the reliability system 200. Accordingly, the system groupings table 236 may contain lists of components 112 associated with the different systems 104.

The miscellaneous ad hoc groupings table 240 can be used to maintain user defined groups or assemblies 272 of data. Examples of user defined groups 272 include groups of components 112 comprising additional systems 104 or subsystems that are defined for use in connection with performing maintenance or repair tasks. For instance, a group 272 of components 112 within a tag-out boundary may be defined in connection with creating a list of maintenance and repair tasks that are to be performed while the group 272 of components 112 within the tag-out boundary are offline.

The report generator 244 may comprise an administrative program 204 function that operates to compile records associated with other functions or modules to produce reports for presentation to a user. These reports may comprise reports related to systems 104, component lists 108, components 112 or other aspects of a plant 100. In addition, reports may comprise procedures to be performed by maintenance personnel as part of scheduled maintenance or repairs, the actual or anticipated cost of maintenance work or repairs, and statistics. In accordance with embodiments of the present invention, the report generator 228 is user-configurable, to allow the user to include desired information in a desired format. In addition to supporting the generation of reports in response to queries entered by the user, sophisticated built-in reports can be accessed through buttons and/or drop down menus provided through the user interface 248. Accordingly, user defined groups 272 or other groupings, for example in the form of reports or tables, may be created or accessed by or in association with the report generator 244, formatted for implementation tools. A report may be provided to a user by the report generator 244 in various ways. For example, a report may comprise a screen presentation to a user, a hard copy output or a stored file that can be output at a later time.

The risk viewer 246 allows a user to determine or diagnose various perceived or anticipated problems associated with a complex plant 100. For example, if a noise or other abnormal condition is perceived, the risk viewer 246 allows a user to access information describing the consequences if a component 112 associated with the perceived abnormal condition should fail. Accordingly, the risk viewer 246 can provide or operate in association with diagnostic functions. In accordance with embodiments of the present invention, the risk viewer 246 comprises a specialized set of queries or searches. In accordance with further embodiments of the present invention, the risk viewer 246 may provide output related to the consequences of the failure of a component 112 or other diagnostic information by accessing operating experience considerations 220 or risk information associated with a template 252 and/or 256 for a component 112.

The user interface 248 may comprise a graphical user interface for receiving instructions and information from and presenting information to a user. In accordance with embodiments of the present invention, the user interface 248 presents information using expandable tree views. In addition, tree views can speed the application process through presenting information in context and by providing checkboxes. In accordance with further embodiments of the present invention, the user interface 248 presents information in association with drop down menus.

Figure 3:
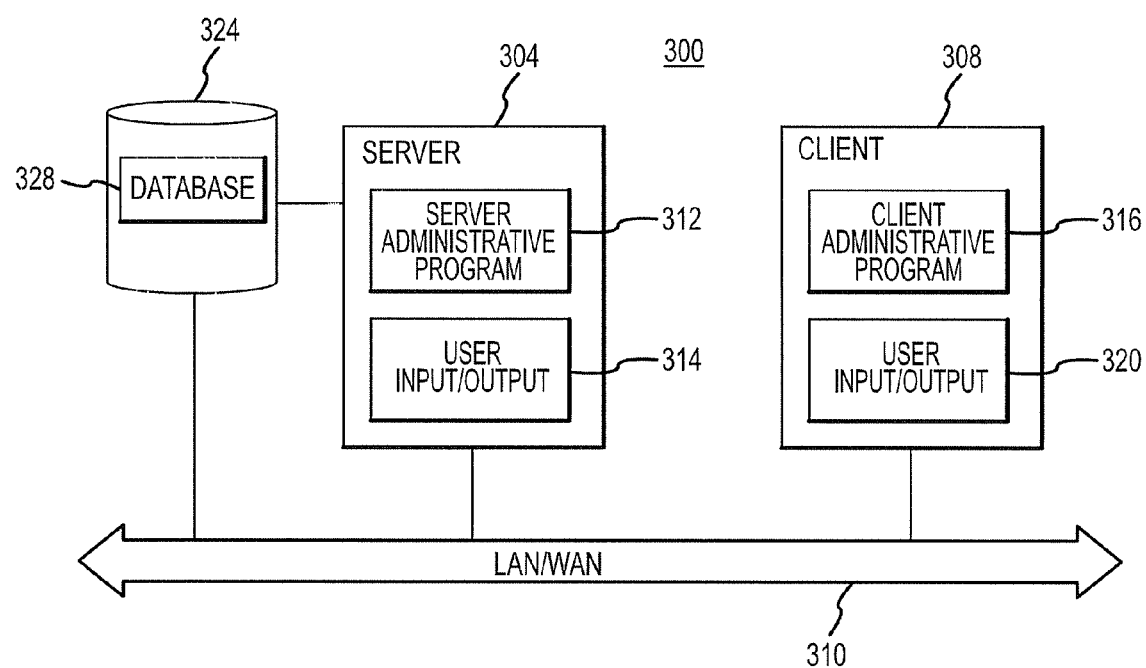
FIG. 3 is a block diagram of components of a reliability system platform in accordance with embodiments of the present invention.

With reference to FIG. 3, components that may be included as part of a distributed computing system 300 for implementing the disclosed reliability system 200 are illustrated. In particular, the computing system 300 is an example of an arrangement of computer components that may be used in connection with the execution of application programming, such as the administrative program 204, and the development, operation and storage of a database in accordance with embodiments of the present invention. As illustrated in FIG. 3, the distributed computing system 300 may comprise a server computer 304 and one or more client computers or workstations 308 interconnected by a network 310, such as a local area network (LAN) and/or a wide area network (WAN). In accordance with embodiments of the present invention, at least a portion of the network 310 may comprise the Internet.

The server computer 304 may comprise a general purpose computer, and may execute instructions on its processor or processors that implement a server administrative program 312 portion of the administrative program 204. As an example, the server administrative program 312 may perform the processing necessary in order to respond to information, commands and requests received from a client computer 308. The server administrative program 312 may also operate to provide time based maintenance task lists or workscopes. Accordingly, the server administrative program 312 may comprise instructions implementing at least some of the report generator 244 functions of the administrative program 204. In accordance with still other embodiments, the server administrative program 312 may additionally receive real-time information from sensors and instruments included in the complex plant 100, permitting realtime monitoring and updating in connection with the reliability system 200. In addition, the server administrative program 312 may operate to support or provide at least part of the user interface 248 portion of the administrative program 204. The server computer 304 may also include user input/output facilities 314 to allow user operation of the reliability system 200, and/or configuration of the reliability system 200.

The client computer 308 may comprise a general purpose computer, and may execute instructions on its processor that implements a client administrative program 316 portion of the administrative program 204. The client administrative program 316 may implement at least portions of the report generator 244 function of the administrative program 204. The client administrative function may further comprise the user interface 248, or portions of the user interface 248, of the administrative program 204. In connection with the receipt of instructions and data from a user, and the delivery of reports to the user, the client computer 308 also generally comprises user input/output facilities 320, such as a keyboard, mouse, monitor, printer and/or other input or output devices.

In addition, the computing system 300 may comprise or be associated with computer storage 324 comprising a database 328 containing the various tables and other information and/or programming maintained as part of the reliability system 200. The computer storage 324 may be implemented as part of the server computer 304 and/or one or more client computers 308. The computer storage 324 may also be implemented as a storage subsystem, such as a redundant array of independent disks (RAID) system. The computer storage 324 may be implemented as a storage area network (SAN) or as network storage. Furthermore, the computer storage 324 may be directly interconnected to the network 310, or interconnected to the network 310 through another component or network node, such as through the server computer 304.

Figure 4:
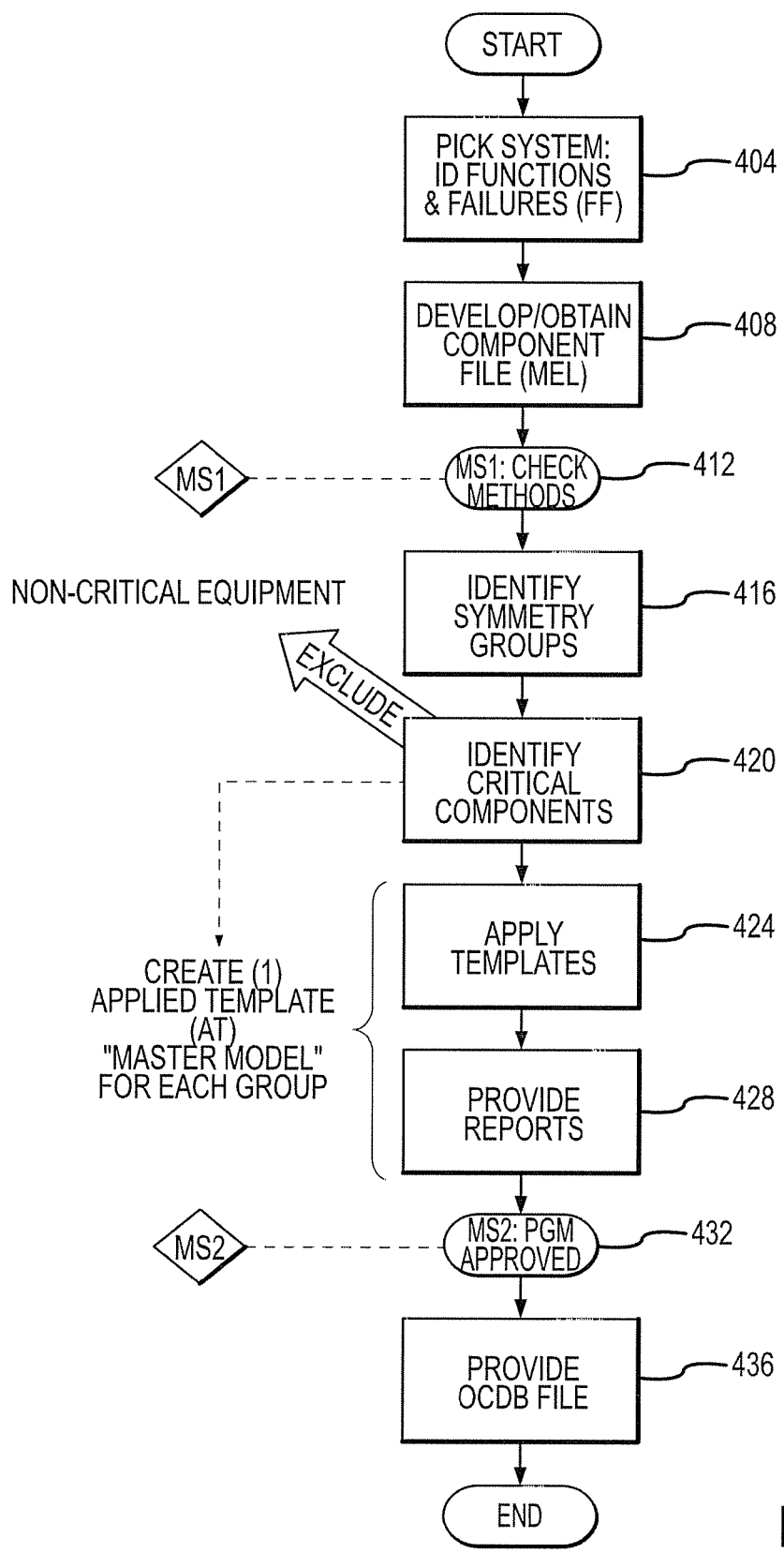
FIG. 4 is a flow diagram illustrating general aspects of the operation of a reliability system in accordance with embodiments of the present invention.

Aspects of the operation of a reliability system 200 in accordance with embodiments of the present invention are illustrated in FIG. 4. Initially, a system 104 is selected, and the functions and failures for the selected system 104 are identified (step 404). The identification of functions and failure modes may include identifying the implications to safety, operations (production) and costs of a failure of the selected system 104. That is, the criticality of a selected system can be determined. In addition, more than one failure mode may be identified for the selected system 104. Furthermore, where more than one failure mode is identified, different safety, operations and cost effects can be identified for the system 104.

The component file or master equipment list (MEL) 216 may then be developed or obtained (step 408). In general, the master equipment list 216 may comprise a list of those components 112 that are required for or are associated with meeting the functional requirements of the selected system 104. Development of the master equipment list may therefore comprise performing an inventory of components 112 that have a bearing on the identified function of the selected system 104. Alternatively, a previously prepared or developed master equipment list 216 may be downloaded to the reliability system 200, and components from that master equipment list 216 may be associated with the selected system 104.

At step 412, a preliminary planning review may be performed. As part of the preliminary planning review, the functions of and boundaries between systems 104 included in the complex plant 100 (or identified for purposed of operation of the reliability system 200) may be considered together, to ensure adequate coverage of significant aspects of the overall plant 100. Accordingly, it can be appreciated that steps 404 and 408 may be performed for each system 104 of the plant that are to be included in the model developed as part of the reliability system 200. Furthermore, it can be appreciated that the process may be performed iteratively, such that the identification of plant systems 104, the identification of system 104 functions and failure modes, the components 112 included within the identified systems 104, and/or the allocation of components 112 between systems 104 are revised to accurately reflect complex plant 100 design and/or operation.

After associating components 112 with a system 104, and preferably after associating components with a number of systems 104, symmetry groups of components 112 may be identified (step 416). The identification of symmetry groups may comprise identifying multiple trains or skids consisting of groups of components 112 within a particular system 104 or within the plant 100 that are functionally identical.

At step 420, critical components may be identified. In accordance with embodiments of the present invention, a critical component is a component 112 that has an impact on a safety, operations or cost function of a related system 104. In accordance with embodiments of the reliability system 200, a critical component is one that is associated with a single failure direct function impact. That is, the failure of a critical component has a direct impact on the safety, production operations or cost performance of the complex plant. In determining whether a component 112 is a critical component, consideration may be given to whether the system 104 includes redundant components 112. Consideration may also be given to whether there are hidden or indirect safety, operational or cost implications associated with the failure of a particular component 112. If a component 112 is determined to not be critical, it can be excluded from the model of the complex plant 100 established by the reliability system 200. The exclusion of non-critical components, in accordance with embodiments of the present invention, is an important aspect to developing a relevant maintenance and repair response, and to developing an efficient model of the complex plant 100. For example, as many as 60-80% of the components in a typical plant may be considered non-critical, and therefore do not require a model or template in the reliability system 200, and do not require any scheduled maintenance. Therefore, by identifying and excluding non-critical components, the efficiency of the reliability system 200 and of the complex plant 100 maintenance program can be improved. In accordance with embodiments of the reliability system 200, a justification or basis may be required in connection with components 112 that are identified as non-critical, for example to provide documentation of decisions to treat certain components as non-critical. A justification or basis for determining that a component 112 is non-critical can be stored in the risk/symmetry table 218 associated with the master equipment list 216 for the complex plant 100.

For those components 112 that are identified as critical, applied templates 256 are created (step 424). The creation of applied templates 256 may comprise obtaining a library template 252 from the template library 208, and saving a copy of that library template 252 as an applied template 256 in the set of applied templates 212. Saving a copy of a library template 252 as an applied template 256 may comprise modifying a copy of the library template 252, at least to include a reference between the component 112 being modeled and the applied template 256. Additional modifications may also be made to a copy of a library template 252 in creating an applied template 256. Such additional modifications may, for example, reflect differences between the actual component 112 that is modeled by the applied template 256 or the actual critical function of that component 112 and the component represented by the library template 252. Furthermore, an applied template 256 may be modified to include additional information related to particular aspects of the component 112, or may be modified to exclude information related to particular aspects of the component 112 included in the library template 252, based on the context of the system 104 that includes the component. The creation of an applied template 256 may also comprise modifying a copy of another applied template 256. Such modification may be as simple as associating the component tag of the component 112 being modeled for the component tag included in the applied template 256 being copied, or may include additional modifications. Alternatively, where there is no library template 252 that can serve as a suitable starting point, an applied template 256 may be constructed without using a library template 252 as a starting point. Whether or not an applied template 256 is created by modifying a library template 252, a copy of the applied template 256 may be saved as a library template 252, for example if it is anticipated that it will be useful in connection with modeling other components 112.

As can be appreciated from the description provided herein, the identification of a suitable library template 252 or applied template 256 for modification and use in connection with a particular component can be facilitated by the identification of symmetry groups performed at step 416. In particular, components 112 that are included in identical trains or skids performing identical functions can generally be modeled using a template that is substantively the same. Therefore, by identifying symmetries, the step of associating a template 256 that accurately and appropriately models a component 112 can, after creating an applied template 256 for one instance of the component 112, comprise making a copy of and/or reference to that applied template 256 for association with a corresponding component 112 in a symmetrical system 104, train, or skid. In accordance with embodiments of the present invention, copies of an applied template 256 may be made for (or an applied template 256 may be associated with) components 112 that are symmetrical with a component 112 for which an applied template 256 is originally created automatically, based on symmetry information contained in the risk/symmetry table 218.

After development of a complex plant 100 model through the creation of applied templates 256 for the modeled systems 104, reports can be provided (step 428). In general, reports are created by operation of the report generator 244, in response to selections and/or queries made by a user. Such reports may include preventive maintenance operations and repair operations, grouped or partitioned according to functions or symmetries that have been identified and that are reflected in the model maintained by the reliability system 200.

Prior to deploying the reliability system 200, a review of the plant 100 model may be made (step 432). Once finally approved, the reliability system 200 may be provided as a database file or files, in association with the administrative program 204, and operated as a complete preventive maintenance and diagnostic repair program (step 436).

Figure 5:
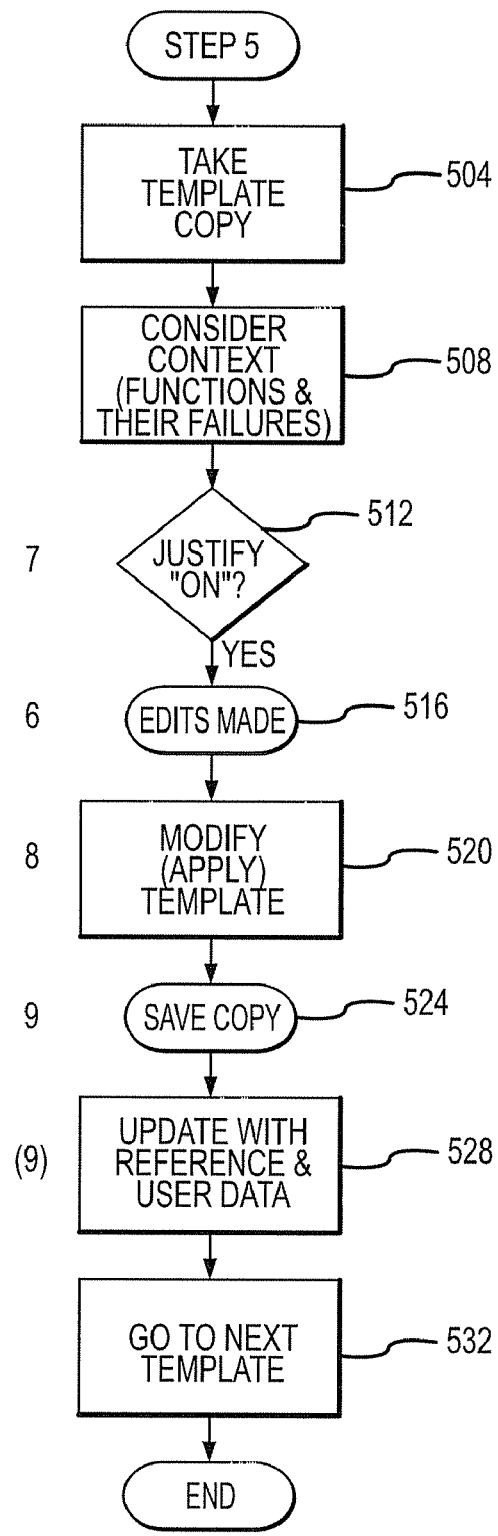
FIG. 5 is a flow diagram illustrating aspects of the creation of applied templates in connection with a reliability system in accordance with embodiments of the present invention.

With reference to FIG. 5, aspects of the operation of a reliability system 200 with respect to the creation of applied templates 256 are illustrated. Initially, a template copy (i.e. a copy of an existing library template 252 or applied template 256) is taken for editing by a user (step 504). As an alternative, an applied template 256 can be created from scratch, in which case a copy would be saved to both the template library 208 and the set of applied templates 212 after creation.

The context in which the component 112 to be modeled by the applied template 256 being created operates is then considered (step 508). Consideration of the context of the component 112 may comprise identifying the system 104 of which the component 112 is a part, and the function performed by the system 104 within the complex plant 100. Through consideration of the functional requirements provided by the component 112, the critical requirements and failures associated with the component 112 are identified.

In accordance with embodiments of the reliability system 200, each applied template 256 must be justified in order to be included as part of an operational reliability system 200. If it is determined at step 512 that justification is required, the user is prompted for justifications (step 516). Justification can include requiring that a dominant failure, failure effects (direct or hidden safety, operational and cost effects), preventive maintenance tasks, and/or preventive maintenance task intervals are identified for the component 112 in the applied template 256. Modifications or edits to the applied template 256, for example as compared to an earlier version of the applied template 256 instance being edited, or as compared to the library template 252 or applied template 256 on which the applied template 256 instance being edited are based, may as part of justification be required to be associated with textual reasons or justifications for changes. Furthermore, the textual justifications may be associated with the person making the entry. By requiring justification for changes, regulatory compliance review is facilitated. In addition, an adaptable or living reliability system 200 is provided. Another advantage of requiring justification through operation of the reliability system 200 in connection with the creation of applied templates 256 is that justification can be required at the point of change or edit entry, while the reason for the change is fresh in the user's mind.

After justification, or after it is determined that justification is not required, the applied template 256 instance is associated with a particular component 112 within a system 104 of the complex plant 100 (step 520). That is, the template is "applied" to an actual component. A copy of the applied template 256 is then saved to the database 328 as one of the applied templates 256 in the set of applied templates 212 (step 524). In particular, the applied template 256 is saved with all of the historical information, including information regarding the lineage (e.g. the library 252 and or applied 256 templates on which the saved applied template 256 is based). Examples of other information that can comprise or be included with the copy of the applied template 256 includes: dominant failures of the component 112 or parts of the component 112 being modeled; the identified hidden safety, operational and cost failure effects; the preventive maintenance tasks for identified failure modes; preventive maintenance tasks for the identified context; the explicit basis inputs; the implicit function-failure-task links; the explicit contextual information; the identity of the user who has entered or made changes to the applied template 256; the dates of changes; associations with workscopes; and associated component tags. In accordance with embodiments of the reliability system 200, implicit information is obtained from database design relationships, while explicit information is obtained from notes or entries made in provided text fields. As the copy of the applied template 256 is saved, it may be updated with current reference and user data (step 528). The process for creating an applied template 256 may then be continued by getting or creating a next template (step 532).

Figure 6:
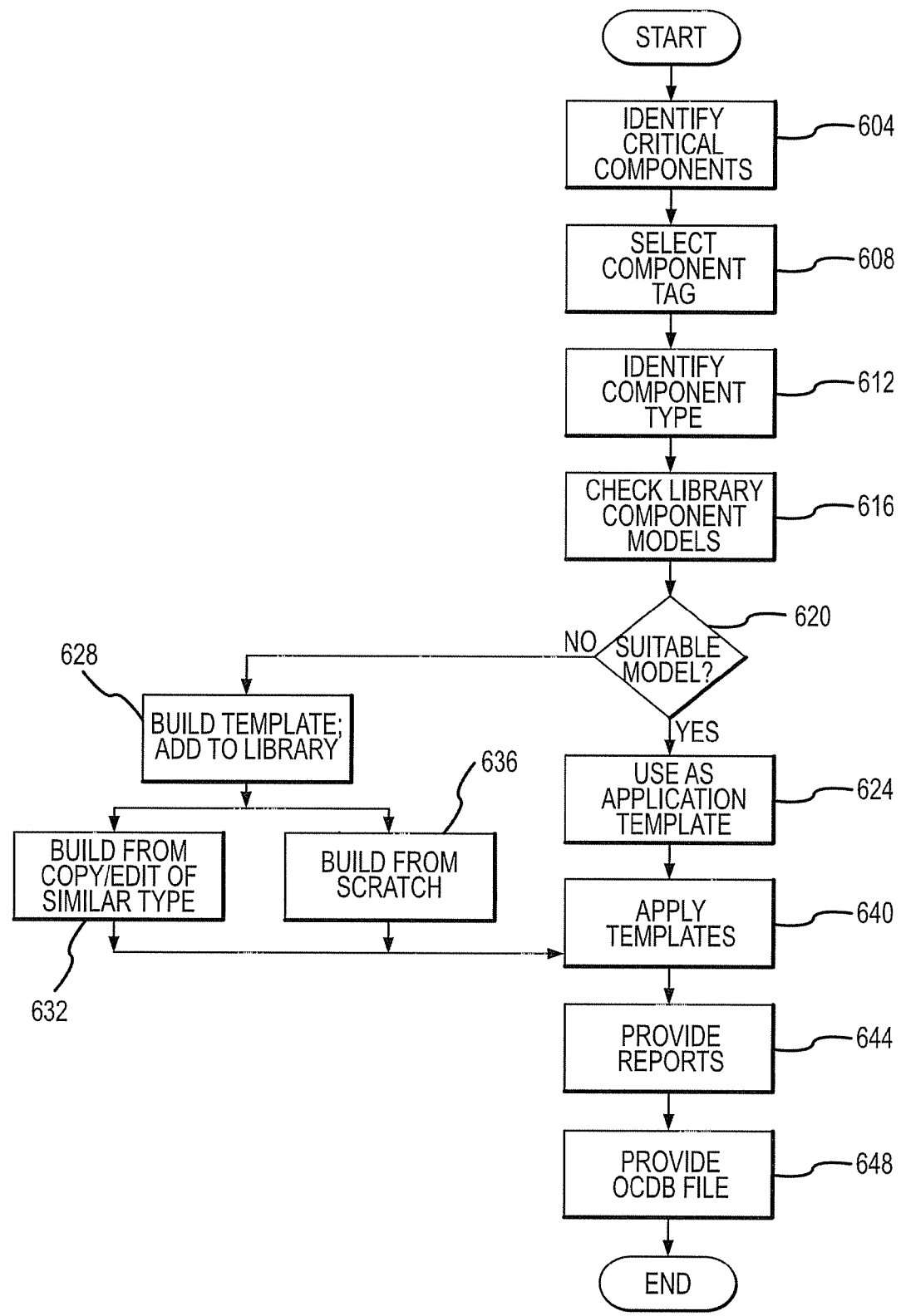
FIG. 6 is a flow diagram illustrating other aspects of the creation of applied templates in connection with a reliability system in accordance with embodiments of the present invention.

With reference to FIG. 6, generalized aspects of a process for creating an applied template 256 in accordance with embodiments of the present invention are illustrated. In general, templates are applied only to critical components 112. In accordance with further embodiments of the reliability system 200, blank library templates 252 can be provided to facilitate creating an applied template 256 that is completely customized. Accordingly, an initial step is to identify critical components 112 (step 604). Critical components are components 112 that by failing will directly compromise the system 104 with which they are associated, or that otherwise impact the safety, operations or costs of the complex plant 100. After identifying critical components 112, one of those components 112 can be selected by selecting the component tag for one of the critical components (i.e. by selecting one of the identified critical components) (step 608). A component tag serves to uniquely identify a component within a complex plant 100.

The component type for the selected component 112 can then be identified (step 612). The component type can assist in identifying any suitable, close or otherwise appropriate library templates 252 that might already exist, as library templates 252 are typically organized in the template library 208 by type. Examples of just a few component types that may be used in connection with organizing library templates 252 are pumps, valves, motors and switches. Having identified the component type, the template library 208 can be checked for similar component models (i.e. for library templates 252 that are similar to the selected component 112) (step 616). If a suitable model or library template 252 is found for the selected component 112 (step 620), that library template can be used as the application template 256 (step 624).

If at step 620 it is determined that a suitable model can not be found in the template library 208, a library template 252 can be built (step 628). Building a library template 252 can comprise either copying and editing a library template 252 (step 632), or building the new library template 252 from scratch (step 636).

After selecting an existing library template 252 (at step 624), or after building a suitable library template 252 (at steps 628 and either 632 or 636), the library template 252 can be applied (step 640), for example as described in connection with FIG. 5. Once applied templates 256 have been created, it is then possible to generate and provide reports (step 644) and to provide formatted database files (step 648).

Figure 7:
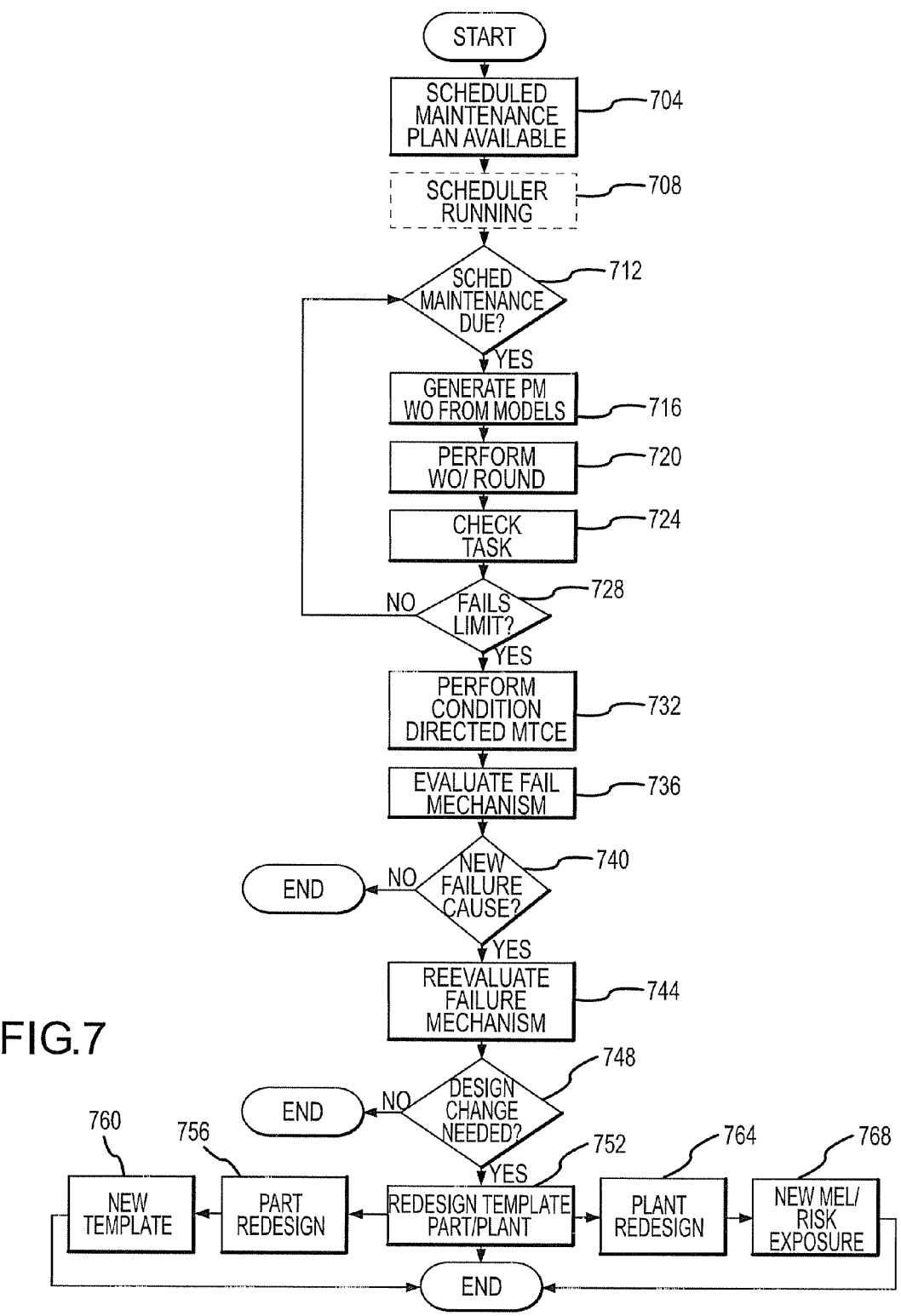
FIG. 7 is a flow diagram illustrating aspects of the operation of a reliability system in connection with an operating complex plant in accordance with embodiments of the present invention.

In FIG. 7, aspects of the operation of a reliability system 200 in connection with a completed or operating complex plant 100 are illustrated. With a scheduled maintenance plan available from the creation of a set of applied templates 256 (step 704) and a scheduler function of the reliability system 200 or of an associated scheduled maintenance program or engine enabled and running (step 708), a determination can be made as to whether scheduled maintenance is due (step 712). More particularly, maintenance operations set forth for components 112 as part of applied templates 256 can be accessed by or made available to a scheduler functions or to a scheduled maintenance program for presentation to a user. If scheduled maintenance is due, a preventive maintenance work order, including electronic instructions delivered through a device such as a personal digital assistant (PDA), is generated from the applied templates 256 that serve as a model of the complex plant (step 716). As used herein, a work order may comprise a set of maintenance procedures that are performed at or about the same time. In accordance with embodiments of the present invention, the applied templates 256 used in connection with the generation of preventive maintenance work orders are those templates stored as a locked set of application templates 228. In accordance with still other embodiments of the present invention, the working set of applied templates 212 can be used.

At step 720 the work order is performed. Performing the work order can comprise making rounds. In addition, the condition or status of components 112 identified as part of the work order are determined or assessed as part of the check task step (step 724). For example, checks and tests can be performed. Tests can include failure finding tasks or tests designed to uncover hidden failures. Work orders can also comprise replacing components or component parts. It is determined at step 728 that a component 112 or component 112 related status does not fail any established limits, the process may return to step 712 to determine whether any additional scheduled maintenance is due.

If it is determined at step 728 that a component 112 has failed an established limit, then maintenance directed by the detected condition is performed (i.e. condition directed maintenance is performed) (step 732). In connection with addressing the failure, the detected failure mechanism is evaluated (step 736). In particular, a determination may be made as to whether the detected failure represented an anticipated functional failure mode. An anticipated functional failure mode may comprise a failure mode that is documented as part of the applied template 256 corresponding to the component 112 subject to the failure. If at step 740 it is determined that the detected functional failure comprised an anticipated failure mode, the process of performing maintenance may end (or the process may return to step 712 for ongoing complex plant 100 maintenance).

If at step 740 it is determined that the detected failure represents a new or unanticipated failure mode, the new failure mechanism is evaluated (step 744). In particular, the failure mode mechanism is evaluated to determine whether it is important or critical, for example with respect to the safety, operations or cost objectives of the complex plant 100. If the failure mode represents an important failure mechanism, it can be added to the templates 252 and/or 256 for the associated component 112. For example, preventive maintenance can be specified that is directed to early detection of a condition that would lead to the failure. A corresponding change may also be made to the risk/symmetry table 218 to reflect the revisions to the templates 252 and/or 256, and to document the rationale for the revisions to the templates 252 and/or 256. In addition, a determination can be made as to whether a complex plant 100 or component 112 design change is needed (step 748). For example, in view of the failure, it may be desirable to replace the failed component 112 with a substitute component 112. If no design change is deemed necessary, the process of performing maintenance may end (or the process may return to step 712 for ongoing complex plant 100 maintenance).

If a design change is deemed necessary or desirable, the failed component 112 or larger aspects of the complex plant 100 are redesigned (step 752). If the component 112 is redesigned (step 756), then the library template 252 and/or the applied template 256 is modified as required so that the redesigned component 112 is modeled correctly (step 760). If larger aspects of the complex plant are redesigned (step 764), then a new or modified master equipment list 216 and risk/symmetry 218 tables are generated, and corresponding changes to the application templates 256 for at least the affected components are generated (step 768). After modifying the component 112 or larger aspects of the complex plant 100, the process may end (or the process may return to step 712 for ongoing complex plant 100 maintenance).

Figure 8:
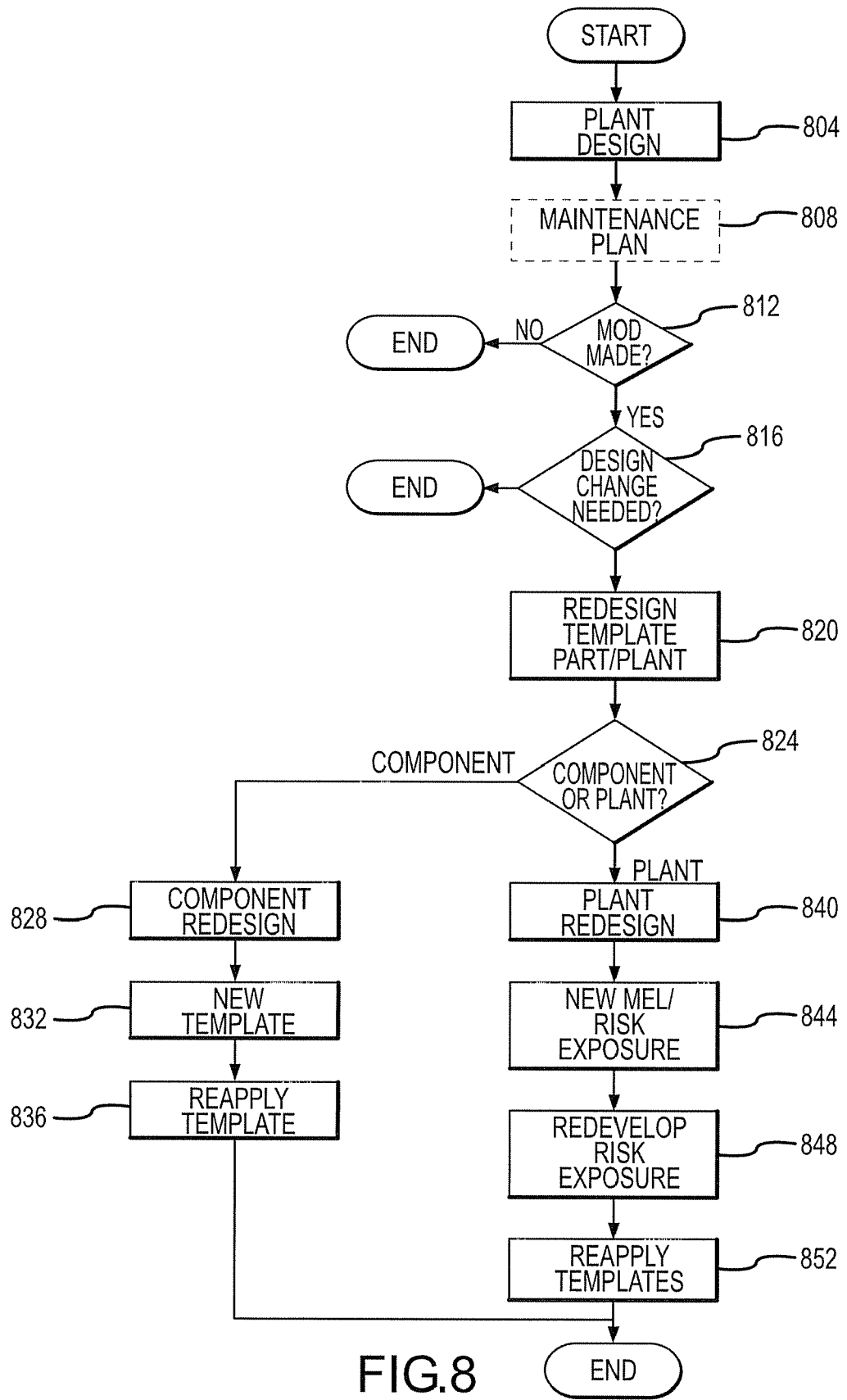
FIG. 8 is a flow diagram illustrating the modification of a reliability system in accordance with embodiments of the present invention.

With reference to FIG. 8, aspects of the modification of a reliability system 200 in response to modifications to a modeled complex plant 100 are illustrated. In particular, at step 804, the design for the complex plant 100 is fixed or has been created, for example in its as-built or as-designed state. A maintenance plan for the complex plant 100, as modeled by the reliability system 200 may then be created (step 808). Accordingly, the model of the as-built or as-designed complex plant 100 may serve as a baseline. Furthermore, the baseline model of the complex plant 100 may be stored as a locked version or set of applied templates 260.

A determination may then be made as to whether the complex plant 100 has been modified (step 812). If no modification has been made, the plant modification process may end. If the complex plant 100 has been modified, a determination may be made as to whether a modification of the plant model within the reliability system 200 is necessary (step 816). A modification that requires a change to the plant model can be subtle. For example, in certain contexts, such as nuclear power plants, a modification that requires a change to the plant model can include the replacement of a part with a different substitute part that has the equivalent fit, form and function of the replaced part, but that is not identical to the replaced part. In addition, a modification can be represented in the master equipment list 216 and/or the risk symmetry map 218. If no modification of the complex plant model is necessary, the plant modification process may end.

If changes to the complex plant model are necessary, those changes can be entered as a redesign to the applied templates 256 corresponding to the redesigned components 112 or systems 104 of the complex plant 100 (step 820). If it is determined that a redesign of a component 112 is necessary (at step 824), then the component 112 is redesigned (step 828), and a new or modified application template 256 for the redesigned component 112 is created (step 832). The new or modified application template 256 is then added to the set of applied templates 212. If it is determined that a redesign of the plant is necessary (at step 824), then the complex plant 100 is redesigned (step 840). A new master equipment list 216 is generated, along with new corresponding risk/symmetry information 218 (step 844). At step 848, the risk to safety operations and cost objectives of the complex plant 100 as a result of the redesign are redeveloped (step 848). In addition, the application templates 256 are changed as necessary to represent the new master equipment list, and the application templates 256 are stored in the set of applied templates 212 (step 852).

Figure 9:
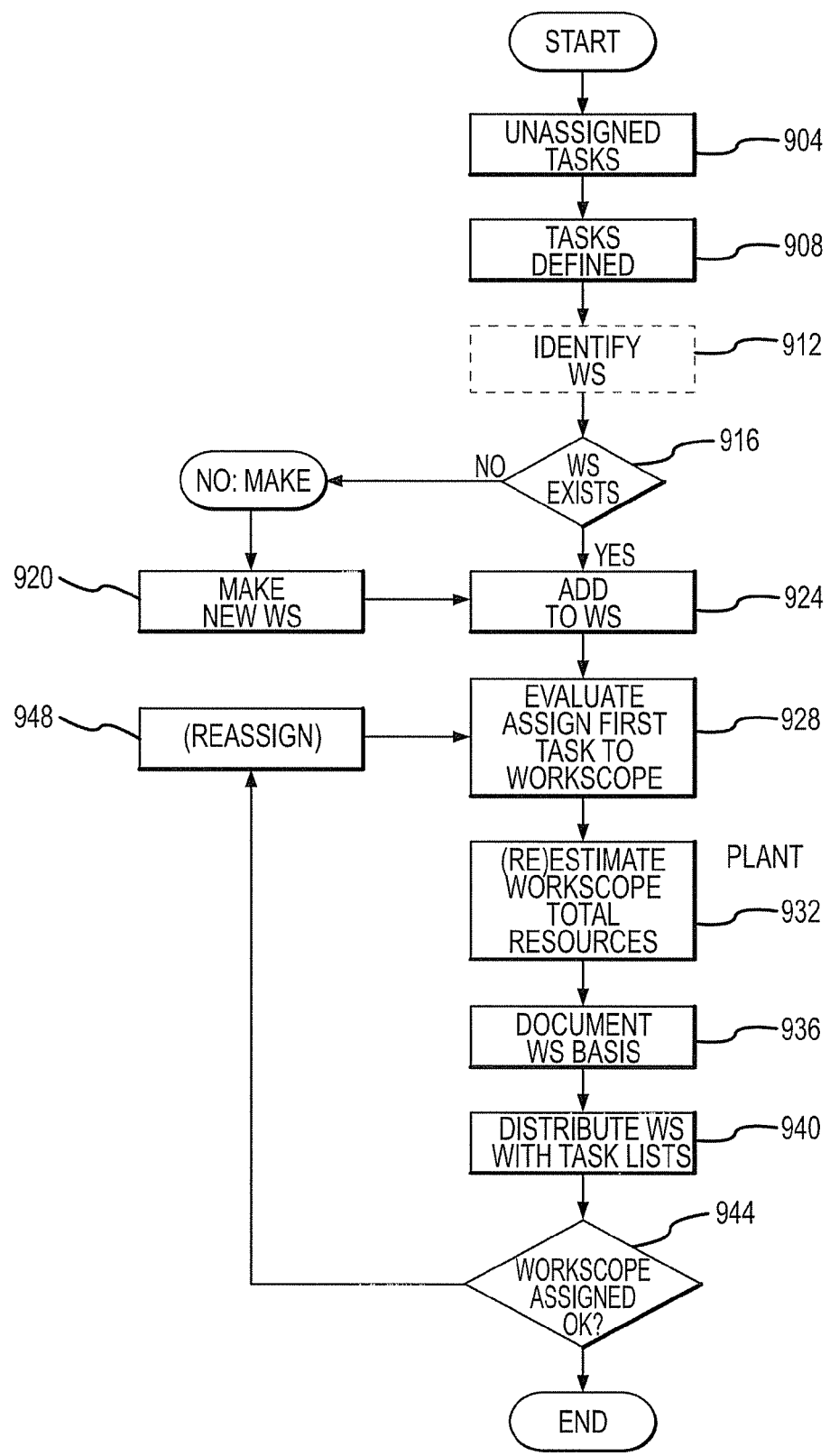
FIG. 9 is a flow diagram illustrating an example process for assigning tasks to workscopes in accordance with embodiments of the present invention.

In general workscope tasks are enumerated lists that comprise complete workscopes. Workscopes may in turn make up or comprise work orders. Workscopes exist as part of library templates 252, but only become truly relevant to a reliability system 200 when they are associated with a context as part of an applied template 256. For example, a component in a containment area of a nuclear power plant will typically comprise tasks that are not necessary in connection with that same component in an easily accessed location. In FIG. 9, an example process for assigning workscope tasks to workscopes is illustrated. Initially, tasks or maintenance procedures are held as unassigned tasks in an unassigned task holding space (step 904) in general, tasks may originate from maintenance or repair procedures associated with components 112 that are represented by applied templates 256 (i.e. with respect to components 112 that are critical to the safety, operations or cost performance of the complex plant). The tasks may then be defined (step 908). The defining of tasks generally includes developing lists of related tasks, task strategies (e.g. time based maintenance, failure finding, corrective maintenance or no scheduled maintenance (NSM)), task plans and resources to be assigned to the task. After the tasks have been defined, those tasks that are deemed appropriate for being associated with a workscope are identified (step 912).

At step 916, a determination is made as to whether an appropriate workscope for a task identified as needing to be assigned to a workscope already exists. If such an appropriate workscope does not already exist, a workscope appropriate for the task is made (step 920). After making (at step 920) or identifying (at step 916) an appropriate workscope, the task is added to that workscope (step 924).

In connection with adding a task to a workscope, an evaluation of the relationship of the task to the workscope is performed (step 928). In particular, the craft associated with the task, and the trip time and tagout boundaries associated with the complete workscope are considered. At step 932, the total resources required for the complete workscope are estimated. The required resources can comprise as assessment of the amount of time in personnel work hours, which typically depends on the time required to perform the individual task or tasks included in the workscope, time for breaks, tool pickup, and tagout time. As part of the evaluation process, documentation of the basis for the grouping of tasks comprising the workscope can be required (step 936). Documentation of task grouping is particularly desirable in connection with complex work orders. In addition, the workscope and the task lists included in the workscope can be distributed to maintenance personnel for review (step 940).

At step 944, a determination can be made as to whether the workscope being evaluated requires revision. Changes to the workscope may be indicated if any of the evaluation steps 928-940 indicate that the grouping of tasks within the workscope is inappropriate. As examples, if the grouping of tasks is random, cannot be completed within a reasonable period of time, requires inefficient routing, or is not within applicable work rules, the workscope should be modified. Whether the tasks included in a workscope are inappropriate can be determined by craft workers who would be called on to perform included tasks if the workscope was implemented. If modification is required, the process proceeds to step 948 for reassignment of the task to a different workscope, and for reevaluation of the workscope at steps 928-940. If the workscope evaluation determines that the workscope is appropriate, the process of assigning a task to a workscope may end.

As can be appreciated by one of the skill in the art after consideration of the discussion provided herein, because workscopes are tied to applied templates 256, workscopes and work scheduled in connection with workscopes change with changes to the master equipment list 216, and/or changes in the identity of components 112. Because the workscopes and scheduled work are tied to the master equipment list 216, workscopes and scheduled work remains relevant to the complex plant 100 as it actually exists, without requiring changes to the reliability system 200, other than changes tracking modifications to the master equipment list 216. In addition, because workscopes apply to components 112 identified as critical, workscopes are directed to those components 112 that have an impact on safety, operations or cost. Accordingly, work performed as part of workscopes is targeted to maintaining important components, such that maintenance resources are not wasted on maintaining unimportant or non-critical components.

Embodiments of a reliability system 200 as disclosed can also provide for or assist in the identification of critical part spares to assist in maintaining an appropriate stock of spare parts. In particular, spare parts that should be kept on hand are identified with reference to the master equipment list 216, and with reference to the consequences to the complex plant 100 if a particular component 112 should fail due to a failure of an included part.

Figure 10:
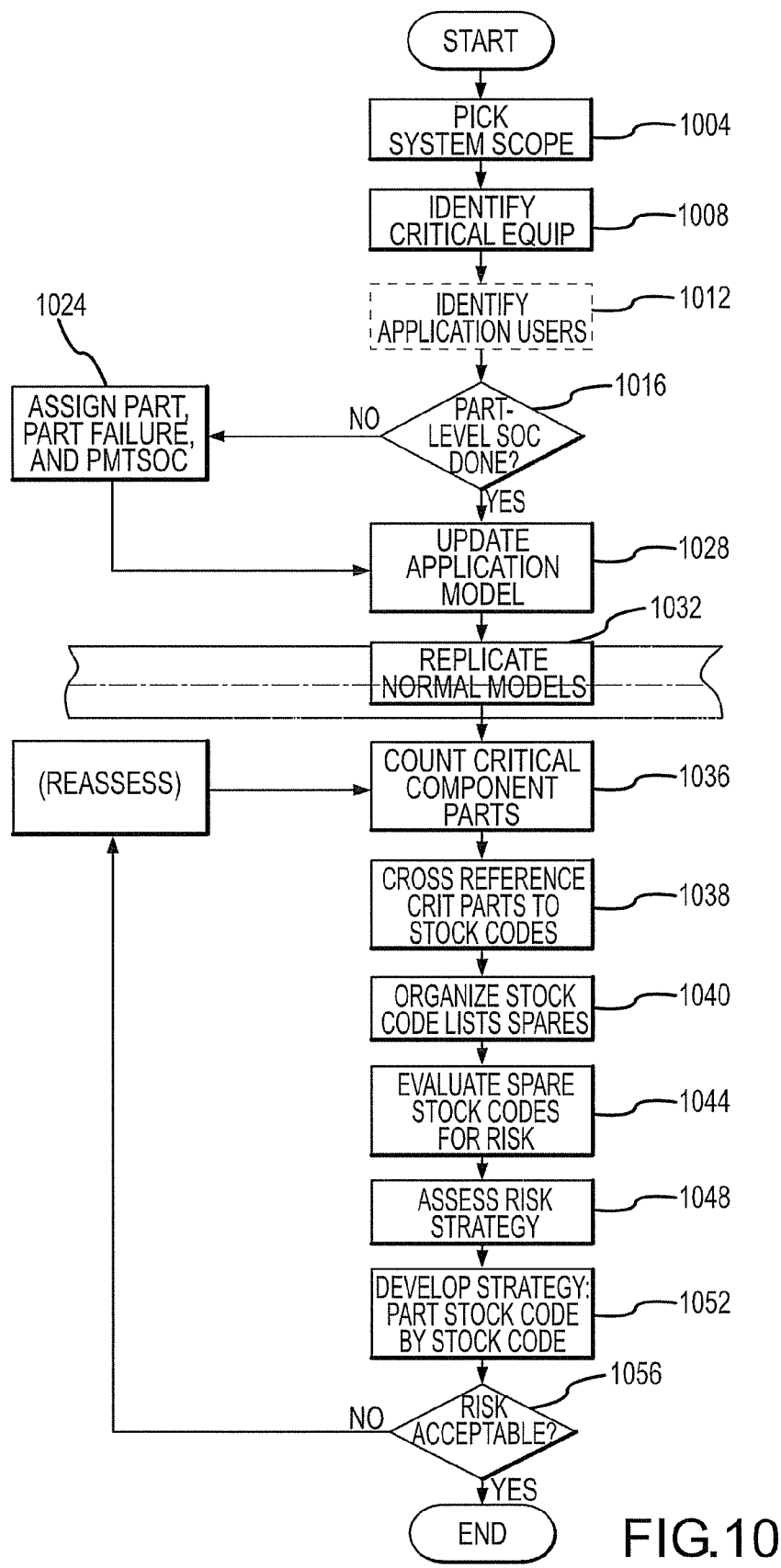
FIG. 10 is a flow diagram illustrating a process for identifying spare parts that should be stocked in accordance with embodiments of the present invention.

FIG. 10 illustrates aspects of the operation of a reliability system 200 in connection with identifying spare parts that should be stocked. Initially, at step 1004, the scope of the reliability system 200 is selected. That is, an engineering analysis of the master equipment list 216 has been completed, and critical equipment (i.e. equipment having a safety, operational or cost impact on the complex plant 100) has been identified. In addition, applied templates 256 have been applied to the critical components 112 in the master equipment list 216. A symmetry mapping, showing replications between components 112 in the master equipment list 216 has also been completed, and critical parts, failure modes and work order tasks are available to identify, extract and summarize, from the applied templates 256. At step 1008, the critical equipment or components 112 from the master equipment list 216 are identified for a system 104 under analysis. At step 1012, components 112 that share a common applied template 256 are identified. This can comprise identifying application users from symmetries identified within the system model to obtain a total number of instances of each component 112 modeled by or represented in the reliability system 200.

At step 1016, each component 112 represented by an applied template 256 is analyzed to determine whether a part level safety, operations or cost criticality has been addressed with respect to the component 112 represented by the applied template 256. That is, every critical component 112 is comprised of at least one part, and at least one part therefore is associated with a failure mode that is associated with the component 112. If no part level criticality has been associated with the part, a part level criticality is added or assigned to the applied template 256 and, with respect to critical parts, a safety, operational or cost consideration is assigned to the part (step 1024). This may include analyzing the probability of failure associated with the part, and the predictability of failure of the part. After assigning criticality to a part, or after determining that a part level criticality has already been assigned, the application model, as represented by the applied templates 256 is updated (step 1028). In particular, information regarding criticality is added to an applied template 256, or the existence of such information in the applied template 256 or the component 112 under consideration is confirmed.

In general, the process of assigning criticality to at least one part included in a critical component 112 is performed for each critical component 112 in the system 104 under consideration. Furthermore, the process of assigning a criticality to at least one part included in every critical component 112 in a system 104 is performed for each system 104 in the complex plant 100. After at least one critical part included in each critical component 112 of each system 104 in a plant 100 has been identified, multiple instances of identical or similar critical parts are identified. In particular, multiple like parts are identified in the applied templates 256 (step 1032). By identifying each instance of a part within a system 104 of a complex plant 100, information related to the number of spares that should be stocked, for example at the complex plant 100 or such that the part is readily available for installation in the complex plant 100, can be obtained. Like (i.e. repeated) parts in all applied templates 256 are then identified, and the number of instances of each repeated part is counted (step 1036). The list of critical parts may then be cross-referenced to stock codes and grouped for risk analysis (step 1038).

The list of stock codes for spares may also be organized for spares analysis (step 1040). Spares analysis may include analyzing whether parts are standard or unique, the safety, operations or cost criticality of the part, the probability of failure, the lead time to procure a replacement, the time to repair, the availability to repair and other considerations affecting the benefits of keeping spares on hand. The critical component part list may be grouped according to part or type of part. The list may then be evaluated for risk (step 1044). In particular, the risk of not stocking spares for critical parts, or of stocking spares for less than all instances of a critical part are analyzed. For instance, if a part fails randomly and infrequently, it may be determined that a replacement for each instance of that part does not need to be stocked. As a further example, for parts that fail due to aging, it may be determined that a replacement should be stocked for each instance of the part.

The risk strategy may then be assessed (step 1048). Assessing the risk strategy can include deciding whether to stock a particular part and the number of such parts to stock, whether to join a user group that pulls stocked components among the members, or whether to not stock any spares of a particular critical component. Accordingly, assessing the risk strategy includes considerations of the consequences of a failure of a critical part, the time to procure a new part, and procurement strategies for obtaining needed parts. At step 1052, a strategy is developed and a decision is made regarding the identity and number of critical parts to stock. The identity and number of parts to stock may be expressed in terms of stock codes. In accordance with embodiments of the present invention, the stock codes are those codes used to identify parts that have been developed in connection with a procurement system in use at the plant. As part of assigning stock codes, a determination may be made as to whether stocked parts are obtained from original equipment manufacturers (OEMs), or from other sources. Furthermore, this decision may be made in terms of risk and convenience. For example, a part supplied by an OEM can generally be assumed to meet all of the operating requirements of the associated component 112. However, when a part from a non-OEM supplier is used, the specifications of that part need to be considered in order to verify that it is a true equivalent to the OEM part.

At step 1056, a determination may be made as to whether the failure risk for the spare part stocking strategy that has been developed is acceptable. If not, the various analysis steps 1032 through 1052 can be repeated. If the determined risk associated with the develop strategy is acceptable, the process of determining the parts to stock in association with a system 104 in the complex plant 100 may end. This process may be completed for each system 104 included in the complex plant 100.

As can be appreciated by one of skill in the art after an appreciation of the description provided herein, embodiments of the present invention facilitate or allow decisions regarding parts to be stocked to be based on an analysis of what parts are critical to a complex plant 100. Therefore, the stocking of unimportant parts is avoided. In addition, embodiments of the present invention allow identical parts within the complex plant to be identified and counted, to facilitate informed decisions regarding the number of spares to stock.

FIGS. 11-17 illustrate screen shots such as may be provided to a user by a user interface 248, comprising the user input/output 320 of a client computer 308 running a client administrative program 316 in association with a server 304 running a server administrative program 312 in accordance with embodiments of the present invention. More particularly, the screen shot 1100 in FIG. 1 illustrates an exemplary list 1104 of generic or library templates 252 that can be selected by a user in connection with the creation of an applied template 256. The list 1104 of library templates 252 can be filtered and sorted, to assist a user in locating a desired template 252. The list 1104 is shown as a window 1108 that overlays template data for a selected library template 252.

Figure 12:
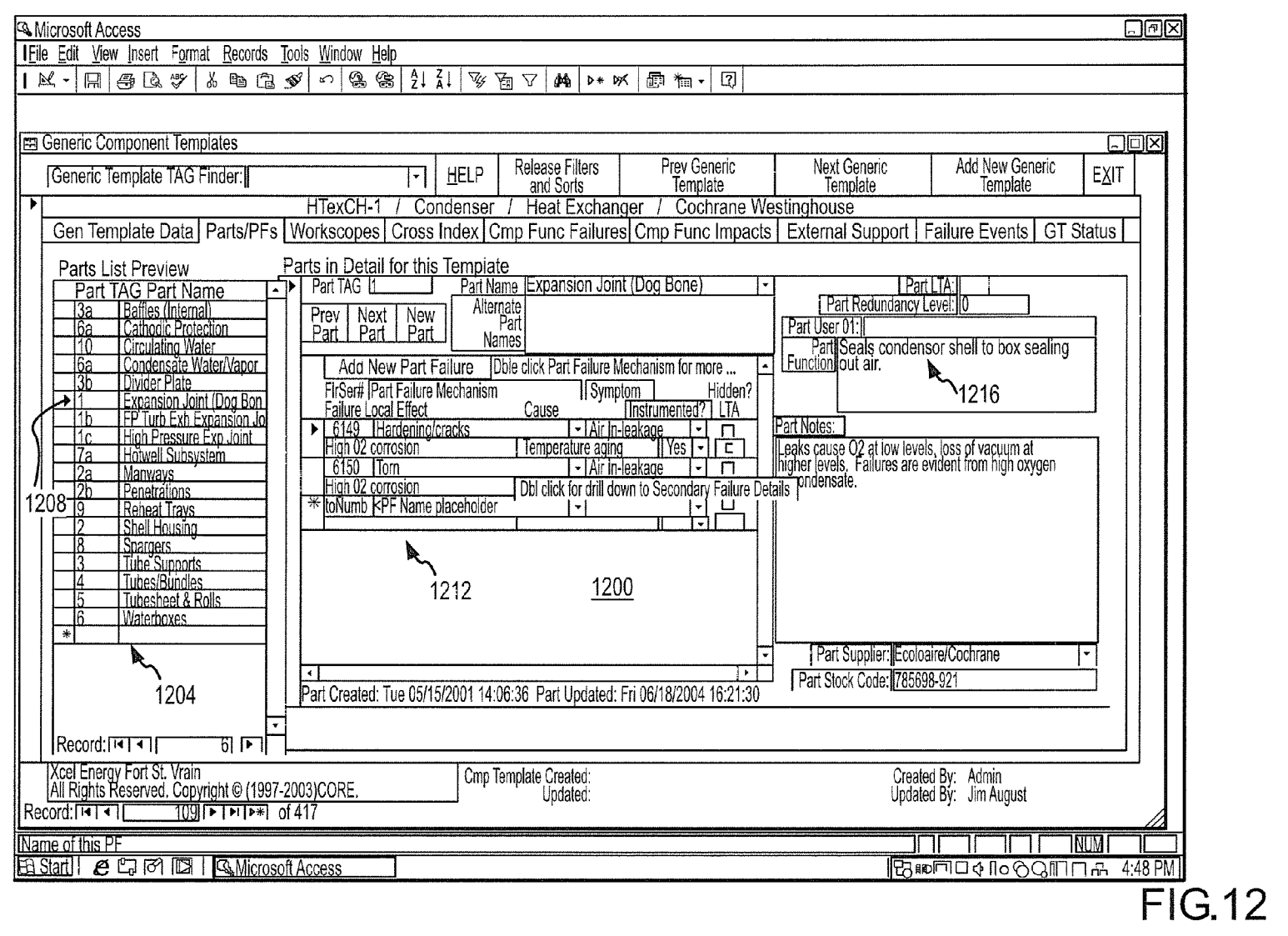

FIG. 12 is a screen shot 1200 illustrating a display of a list of the parts 1204 of a component 112 modeled by a library template 252. In addition, for a selected part 1208, a part failure mechanism 1212 and a part function 1216 are displayed. A user may make selections and enter or access information regarding component parts and failures using provided fields, which may be user editable.

Figure 13:
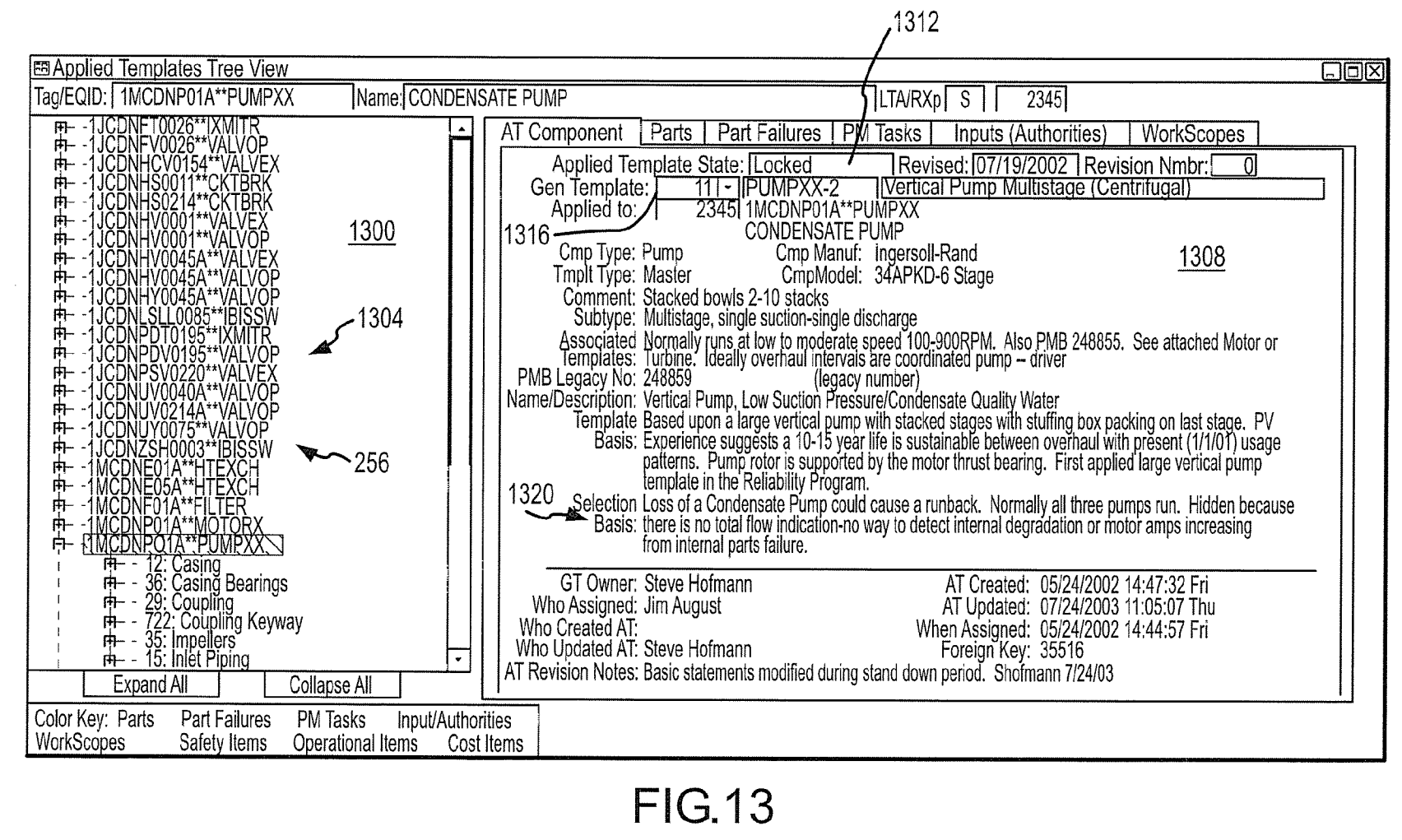

FIG. 13 is a screen shot 1300 of an example a tree view 1304 of applied templates 256 that have been associated with a system 104. The tree view 1304 allows a user to view parts associated with the components represented by applied templates 256. In addition, for a selected applied template 256, template information is displayed in a window 1308. Information can include the state of the applied template 1312, the generic or library template 252 on which the applied template is based 1316 and details related to the selection of the modeled component 112 as a critical component in a selection basis 1320 field.

Figure 14:
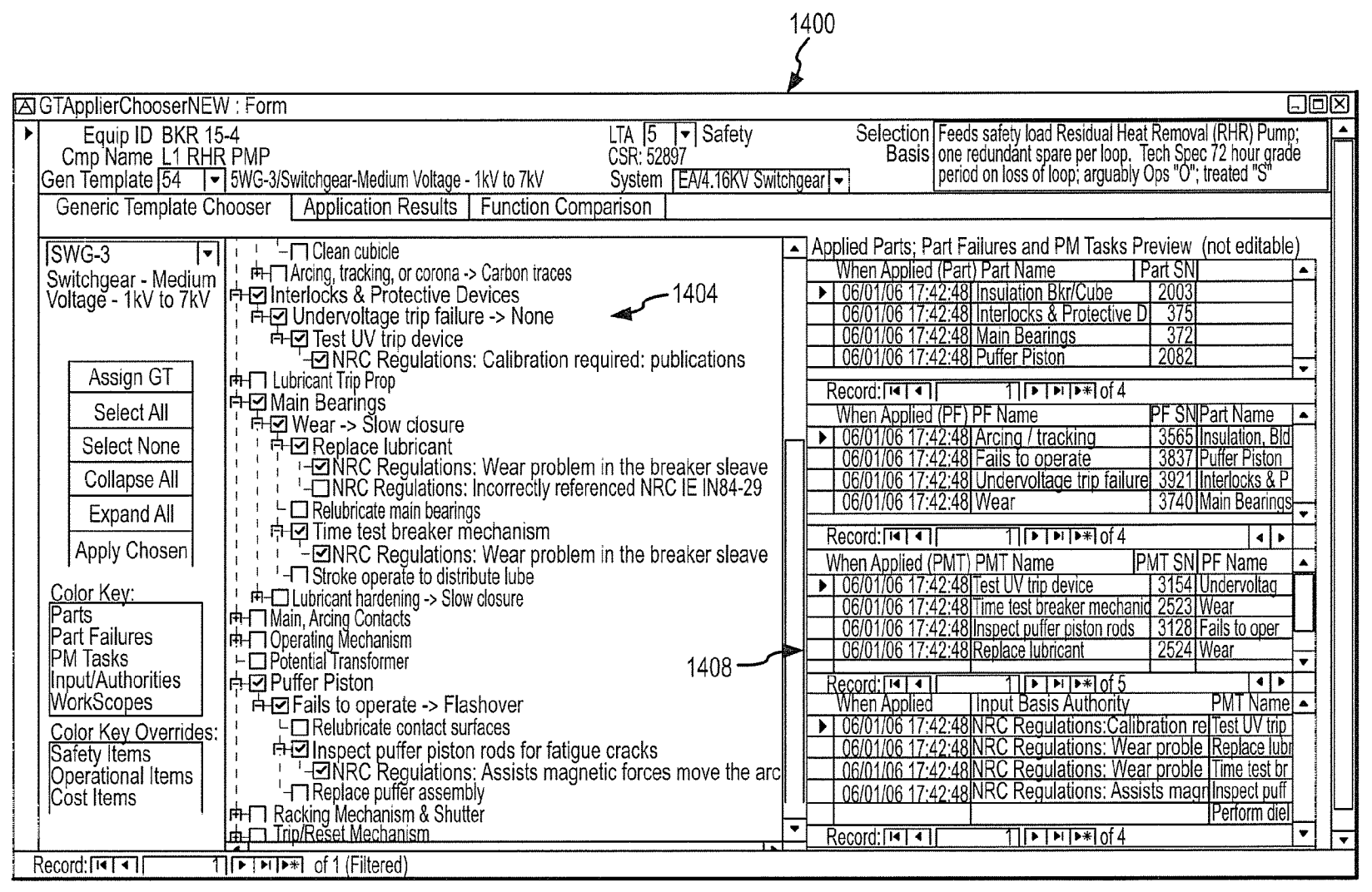

FIG. 14 is a screen shot 1400 of a tree view 1404 that displays parts of a component modeled by a selected applied template 256, part failure modes associated with each part, and preventive maintenance tasks associated with each part failure mode. Check boxes are provided to allow a user to select those parts, failure modes and preventive maintenance tasks that are relevant to the component 112 being modeled by the applied template 256, in view of the context and/or system 104 in which the component 112 is associated. Accordingly, screen shot 1400 is an example of the user interface that is used in connection with the creation of an applied template 256 from a library template 252. Furthermore, FIG. 14 illustrates that, by selecting relevant parts and failure modes, preventive maintenance tasks associated with a component, which are displayed in a non-editable preview window 1408, can be altered. Accordingly, critical or important aspects of a particular instance of a component 112 can be entered or selected by a user quickly and conveniently. FIG. 14 also illustrates that the bases for maintenance tasks or other information related to parts of a modeled component can be entered and recorded. Therefore, regulatory, past experience or other justifications for requiring a particular task can be recorded in association with the task.

Figure 15:
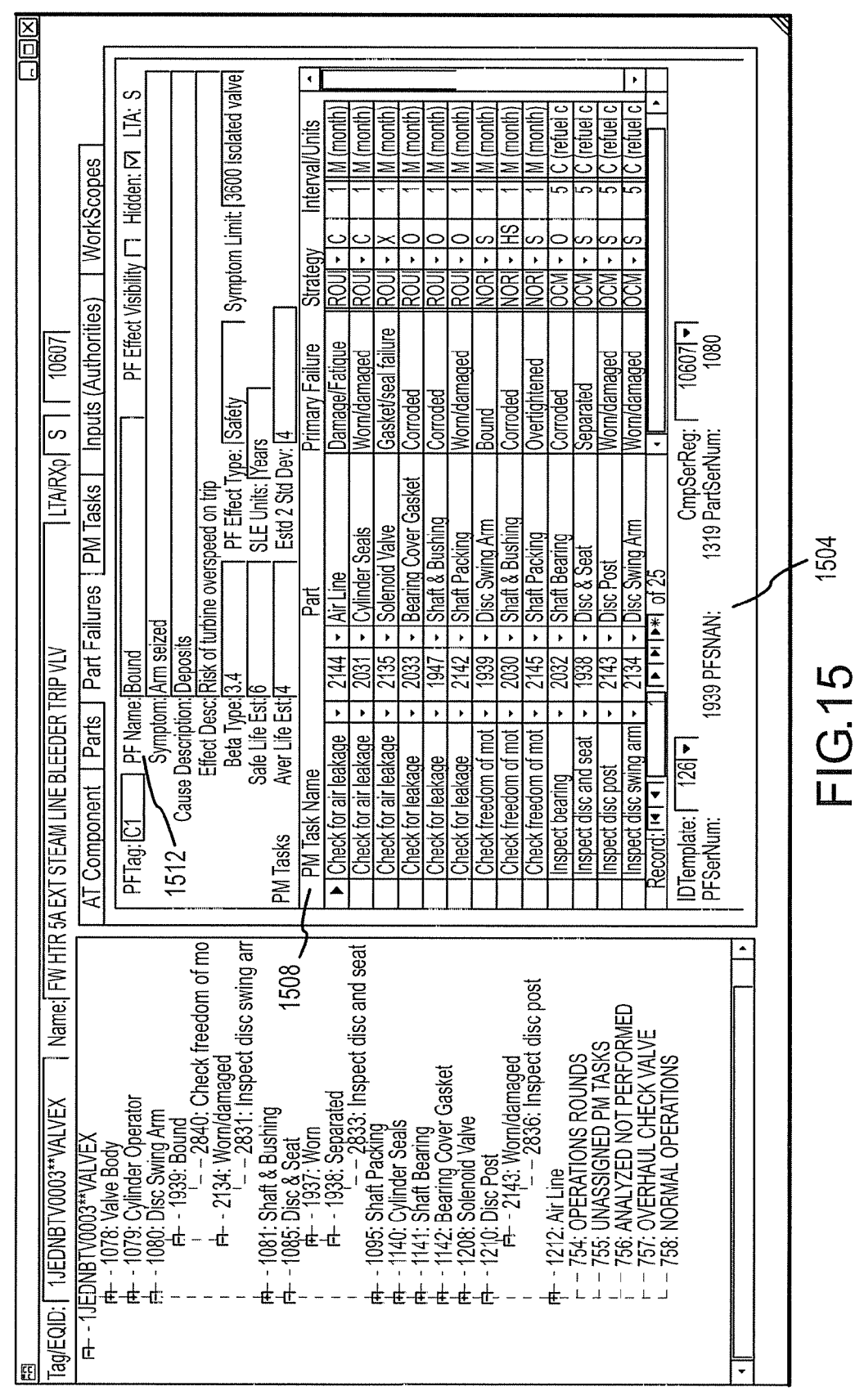
Figure 16:
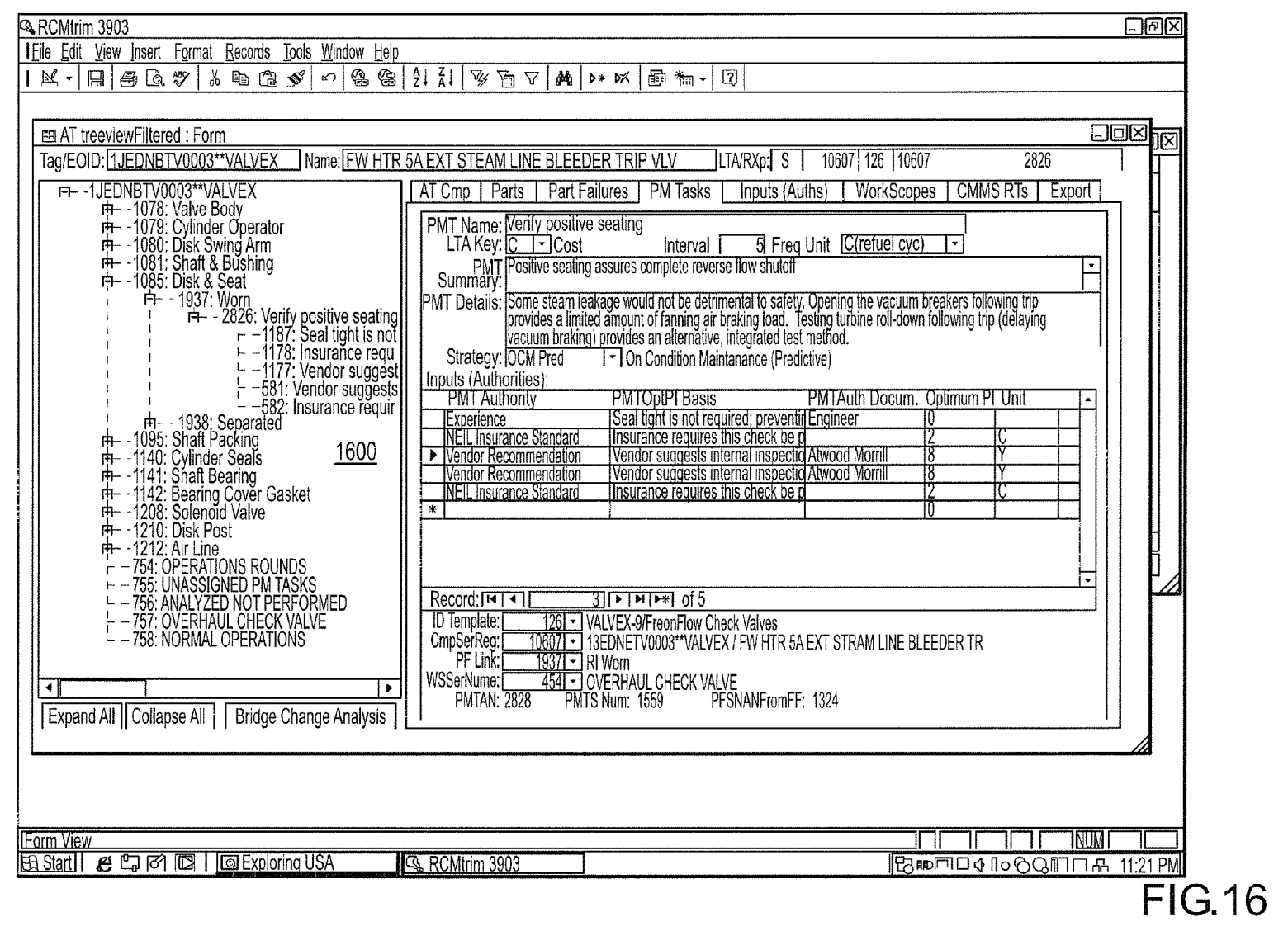

FIG. 15 is a screen shot 1500 of a window 1504 displaying preventive maintenance tasks 1508 associated with the parts of a component 112. In addition, information related to the failure of a selected part failure 1512 can be displayed. FIG. 16 is a screen shot 1600 illustrating information that can be displayed to a user in response to the selection of a particular preventive maintenance task. This information can include a summary of the preventive maintenance tasks, and details of the task, including justification for performing the task.

Figure 17:
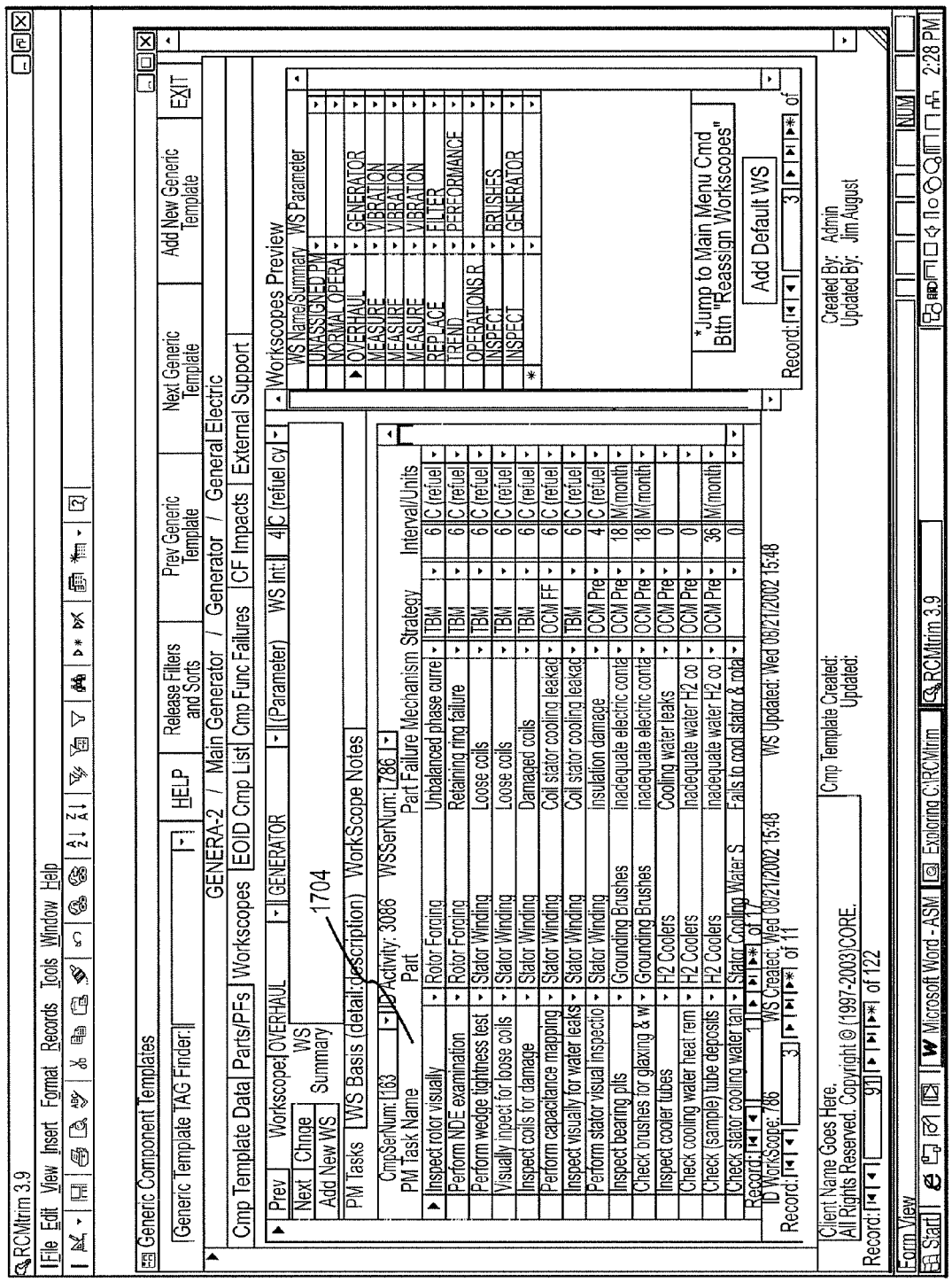
FIG. 17 is a screen shot illustrating a display that may be provided to a user in connection with the selection of a workscope in accordance with embodiments of the present invention.

FIG. 17 is a screen shot 1700 illustrating a display that may be provided to a user in response to the selection of a particular workscope. In particular, a list of preventive maintenance tasks 1704 comprising the workscope can be presented to the user. Drop down lists can also be accessed through the list of preventive maintenance tasks 1704, to access details regarding aspects of the task, or the associated part.

Figure 18:
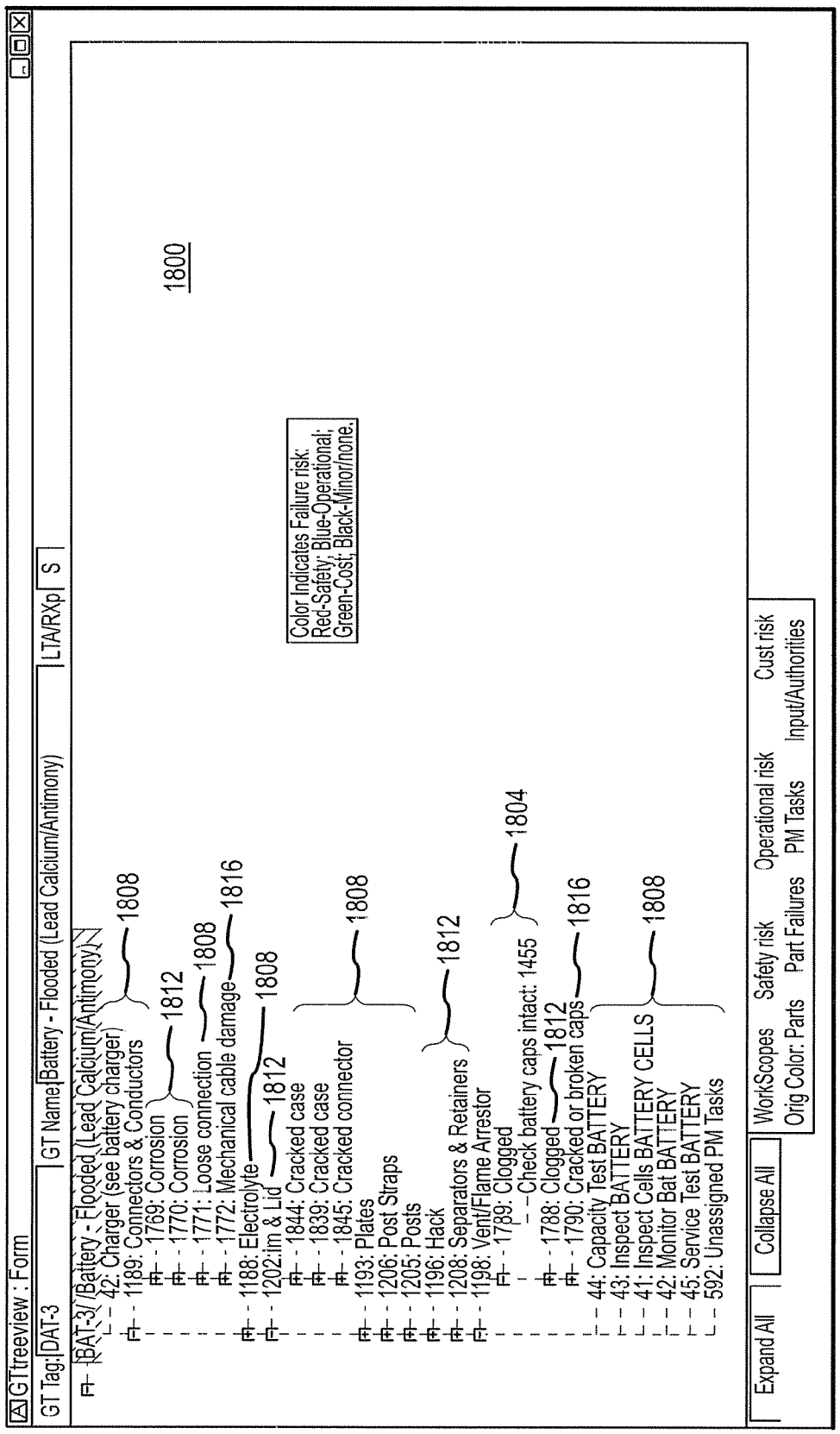
FIG. 18 is a screen shot illustrating a tree view of component parts, failure modes and maintenance tasks.

FIG. 18 is a screen shot 1800 illustrating a display that may be provided to a user in response to the selection of a particular component template 256. In particular, a list of critical parts comprising the represented component is displayed in a tree view. Moreover, the critical parts may be associated with failure modes or conditions, and maintenance procedures that can be performed in connection with the indicated conditions. In accordance with embodiments of the present invention, the failure risk associated with each of the listed parts is color-coded. For example, red items 1804 indicate that failure of the associated part presents a safety risks. Parts and failure modes indicated in blue 1808 represent an operational risk. Parts and failure modes represented in green 1812 present a cost risk. The use of black text 1816 indicates that a condition represents no risk or a minor risk. In general, parts themselves will not be represented in black, as usually only critical parts (i.e., parts that are associated with a safety, operational or cost risk) are included in a component template 256.

Figure 19:
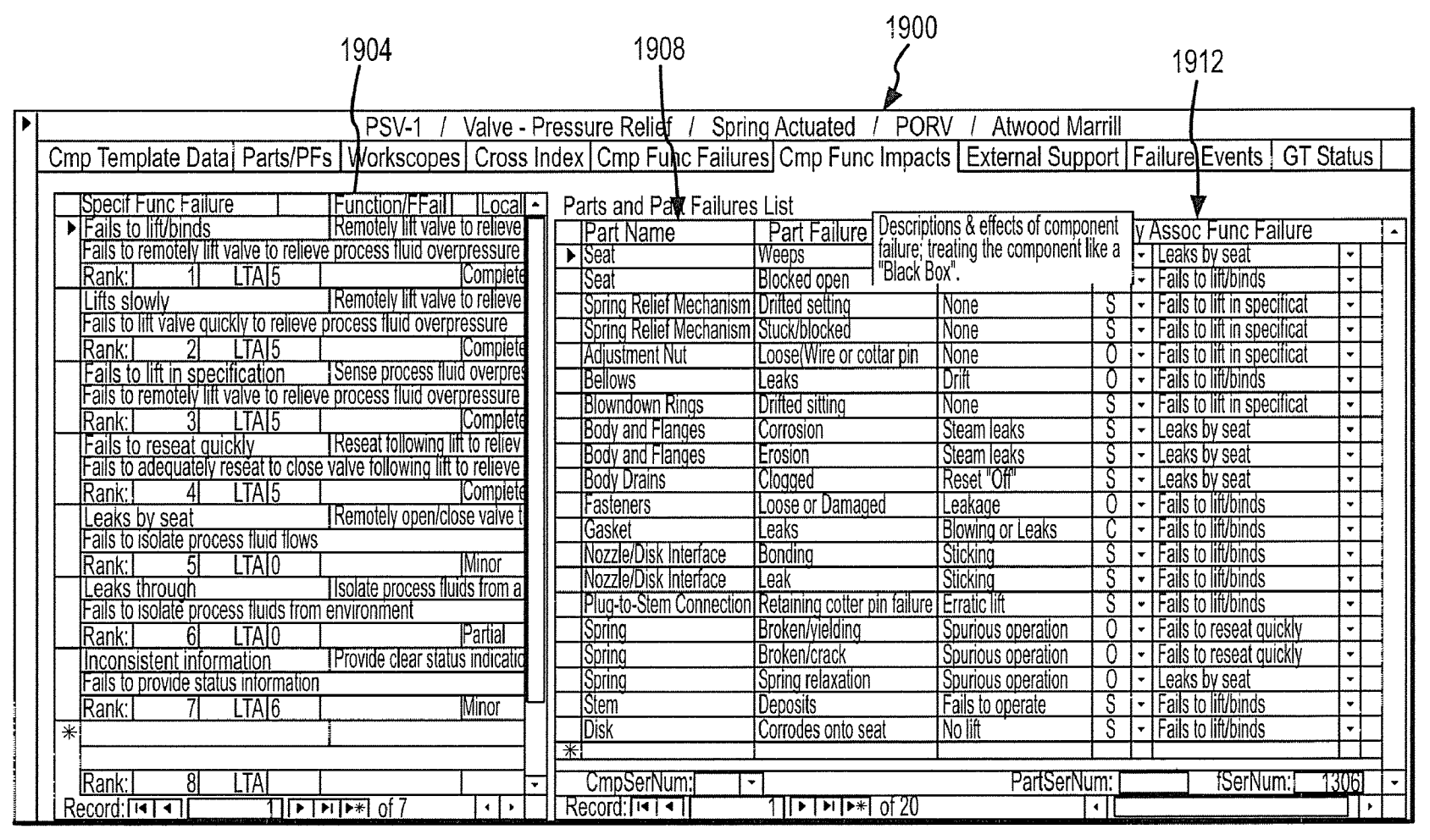

FIG. 19 is a screen shot 1900 illustrating a display that may be provided to a user regarding component function impacts. For example, specific function failures and the parts of a component associated with such failures may be listed in a first section or window 1904. Separately, a listing of parts included in the selected component and a part failures list 1908 may be provided, together with the effects of particular part failures 1912.

Figure 20:
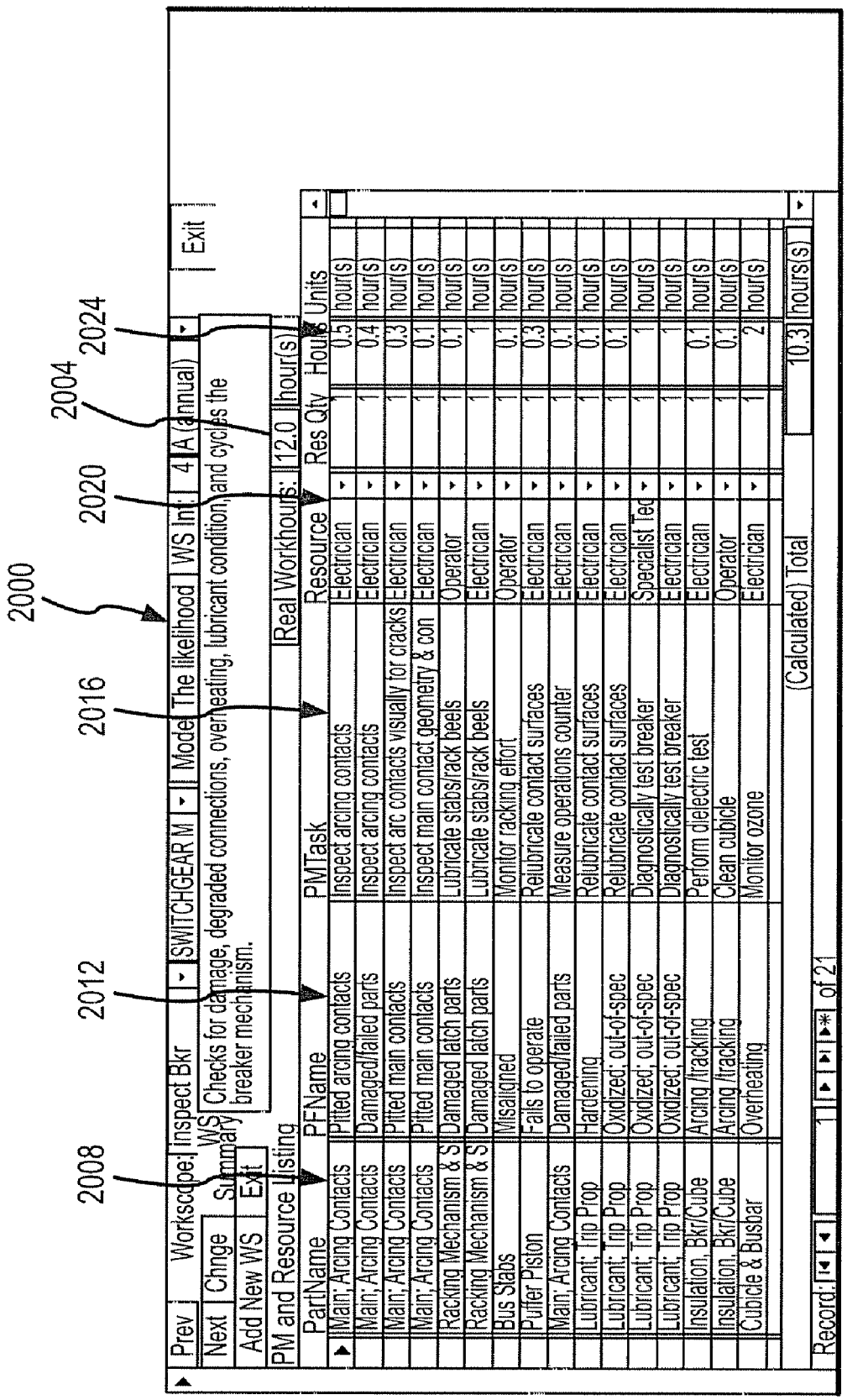
FIG. 20 is a screen shot illustrating a work order scope.

In FIG. 20, a screen shot 2000 illustrating a work order scope displayed in response to the selection of a failure condition associated with a component or component part. The work order scope may include the number of hours 2004 that performance of the included work can be expected to require to complete. In addition, a listing of parts 2008 associated part failures 2012 and preventive maintenance tasks 2016 can be displayed, together with the resource or maintenance personnel specialty 2020 and time 2024 for each of the individual preventive maintenance tasks 2016. Accordingly, the overall work scope can be divided into a member of preventive maintenance tasks that can be assigned to maintenance personnel individually.

FIG. 21 is a screen shot of user-selected parts, part failures and preventive maintenance tasks. In addition, the screen 2100 allows the user to enter the preventive maintenance basis input authority for each part, failure and preventive maintenance task set. Examples of bases for preventive maintenance tasks include regulations, craft experience and manufacturer recommendations.

FIGS. 22A-22L illustrate information that may be included in a library template 252 associated with a component comprising a low-voltage breaker. As can be appreciated by one of skill in the art after consideration of the present disclosure, the information included in the library template 252 may be reduced upon application of the library template 252 as an applied template 256 by determining that particular failures are non-critical based on the particular context of the component being modeled. Additional information may also be included with an applied template 256, for example where additional tasks are required, for instance in order to access failed component parts, for example due to the context of the component being modeled. Other examples of library templates 252 are illustrated in FIGS. 23A-23I, and FIGS. 24A-24H.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A computer implemented method for creating a taxonomy of complex plants, comprising:
    identifying at least first and second systems included in a plant;
    characterizing a function of said first system with respect to said plant;
    characterizing at least a first failure mode of said first system;
    identifying a number of components included in said first system;
    assigning a first context to at least some of said components identified in said first system, wherein said first context is related to said at least a first failure mode of said first system;
    representing a first component included in said first system using a first application template, wherein said first component is assigned said first context, and wherein said first application template is derived from a first library template;
    characterizing a function of said second system with respect to said plant;
    characterizing at least a first failure mode of said second system;
    identifying a number of components included in said second system;
    assigning a second context to at least some of said components identified in said second system, wherein said second context is related to said at least a first failure mode of said second system;
    representing a second component included in said second system using a second application template, wherein said second application template is derived from said first library template;
    wherein said first and second application templates are different from one another, and wherein said differences are a result of at least one of: 1) differences between said first and second components; and 2) differences between said first context assigned to at least some of said components identified in said first system and said second context assigned to at least some of said components identified in said second system;
    determining a response to a first failure condition of said first component assigned said first context;
    determining a response to a first failure condition of said second component assigned said second context, wherein a response to a failure of an instance of said first component included in said first system and assigned said first context is different than a response to a failure of an instance of said second component included in said second system and assigned said second context;
    producing an output comprising information included in said first and second application templates, wherein said output includes a human readable representation of at least a portion of said first application template and a human readable representation of at least a portion of said second application template;
    replacing said first component included in said first system with a first replacement component, wherein said first replacement component is a functional equivalent of said first component, and wherein said first component and said first replacement component differ in at least one respect; and
    in response to said replacing said first component with said first replacement component, revising said first application template to represent said first replacement component, wherein said revising said first application template includes revising said response to a failure of said component represented by said first application template, wherein said revising is performed to reflect said difference in at least one respect between said first component and said first replacement component.

2. The method of claim 1, further comprising:
    documenting a reason for said revising a response to a failure of said first component.

3. The method of claim 1, wherein said method is stored as instructions on a computer readable storage medium.

4. The method of claim 1, further comprising:
    determining a criticality rank of each of said systems included in said plant, wherein said first system has a higher determined criticality rank than a criticality rank of said second system, said method further comprising:
    in response to detecting a failure of said first component included in said first system and in response to detecting a failure of a second component included in said second system, scheduling servicing of said first and second components, wherein said first component is scheduled to be serviced before said second component, wherein the first and second components are the same, and wherein the difference in scheduling servicing is a result of a difference between the criticality of the first system and the criticality of the second system.

5. The method of claim 4, wherein said determining a criticality of said systems comprises determining at least one of safety, production, operations or cost effects of a failure of each of said systems.

6. The method of claim 5, wherein said first system is critical to safety and is ranked more critical than said second system that is critical to production operations, and wherein said second of said systems is critical to production operations and is ranked more critical than a third system that is critical to cost effective operations.

7. The method of claim 1, further comprising:
storing said first and second application templates, wherein said first and second components are critical components, and wherein a template is not stored for a third component that is not identified as critical to any one of said at least first and second systems.

8. The method of claim 1, further comprising:
identifying at least a first critical part included in said first critical component;
updating said first application template to include information related to said first critical part, wherein an updated first application template is created;
storing said updated first application template;
identifying each instance of said first critical part in each of said at least first and second systems included in said plant.

9. The method of claim 1, further comprising:
identifying at least a first critical part included in said first critical component;
identifying each instance of said first critical part in each of said at least first and second systems included in said plant.

10. The method of claim 9, further comprising:
determining a number of spares of said first critical part to stock.

11. The method of claim 10, further comprising:
stocking at least said determined number of spares of said first critical part in inventory.

12. The method of claim 1, wherein said first and second components are the same and are interchangeable, but differ in that said first component is included in said first system and is assigned said first context and said second component is included in said second system and is assigned said second context.

13. The method of claim 1, further comprising:
detecting a failure of said first component, wherein said failure comprises said first failure condition of said first component;
generating a work order, wherein said generating a work order includes outputting instructions setting forth said response to said first failure condition of said first component;
performing procedures comprising a physical implementation of said response to said first failure condition of said first component.

14. The method of claim 1, further comprising generating a preventive maintenance operation report, outputting a preventive maintenance work order.

15. The method of claim 14, further comprising:
performing the work order, wherein performing the work order includes replacing said first component or a part included in said first component.

16. The method of claim 14, further comprising:
performing tests enumerated in said work order.

* * * * *

UNITED STATES PATENT AND TRADEMARK OFFICE
CERTIFICATE OF CORRECTION

PATENT NO. : 7,627,388 B2  Page 1 of 1
APPLICATION NO. : 11/461316
DATED : December 1, 2009
INVENTOR(S) : August et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 264 days.

Signed and Sealed this

Second Day of November, 2010

David J. Kappos
*Director of the United States Patent and Trademark Office*